(12) United States Patent  
McMahon

(10) Patent No.: US 8,928,793 B2
(45) Date of Patent: Jan. 6, 2015

(54) IMAGER ARRAY INTERFACES

(75) Inventor: Andrew Kenneth John McMahon, Menlo Park, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 662 days.

(21) Appl. No.: 13/106,804

(22) Filed: May 12, 2011

(65) Prior Publication Data

US 2011/0279721 A1    Nov. 17, 2011

Related U.S. Application Data

(60) Provisional application No. 61/334,011, filed on May 12, 2010.

(51) Int. Cl.
| | |
|---|---|
| *H04N 5/335* | (2011.01) |
| *H04N 5/345* | (2011.01) |
| *H04N 5/365* | (2011.01) |
| *H04N 5/374* | (2011.01) |
| *H04N 5/3745* | (2011.01) |
| *H04N 5/378* | (2011.01) |
| *H04N 9/04* | (2006.01) |

(52) U.S. Cl.
CPC ............. *H04N 5/345* (2013.01); *H04N 5/3653* (2013.01); *H04N 5/3742* (2013.01); *H04N 5/3745* (2013.01); *H04N 5/378* (2013.01); *H04N 9/045* (2013.01)
USPC ............................ 348/315; 318/321; 318/302

(58) Field of Classification Search
CPC . H04N 5/23238; H04N 5/335; H04N 3/1575; H04N 49/075
USPC ............... 348/315, 294, 312, 321, 303, 218.1
See application file for complete search history.

(56) References Cited

U.S. PATENT DOCUMENTS

| | | | |
|---|---|---|---|
| 4,124,798 | A | 11/1978 | Thompson |
| 4,198,646 | A | 4/1980 | Alexander et al. |

(Continued)

FOREIGN PATENT DOCUMENTS

| | | |
|---|---|---|
| EP | 840502 A2 | 5/1998 |
| EP | 2336816 A2 | 6/2011 |

(Continued)

OTHER PUBLICATIONS

International Search Report for International Application No. PCT/US11/36349, Report mailed Aug. 22, 2011, 3 pgs.

(Continued)

*Primary Examiner* — Nhan T Tran
(74) *Attorney, Agent, or Firm* — KPPB LLP

(57) ABSTRACT

Architectures for imager arrays configured for use in array cameras in accordance with embodiments of the invention are described. One embodiment of the invention includes a plurality of focal planes, where each focal plane comprises a two dimensional arrangement of pixels having at least two pixels in each dimension and each focal plane is contained within a region of the imager array that does not contain pixels from another focal plane, control circuitry configured to control the capture of image information by the pixels within the focal planes, where the control circuitry is configured so that the capture of image information by the pixels in at least two of the focal planes is separately controllable, sampling circuitry configured to convert pixel outputs into digital pixel data, and output interface circuitry configured to transmit pixel data via an output interface.

25 Claims, 14 Drawing Sheets

(56) References Cited

U.S. PATENT DOCUMENTS

| | | | |
|---|---|---|---|
| 4,323,925 A | 4/1982 | Abell et al. | |
| 4,460,449 A | 7/1984 | Montalbano | |
| 4,467,365 A | 8/1984 | Murayama et al. | |
| 5,005,083 A | 4/1991 | Grage | |
| 5,070,414 A | 12/1991 | Tsutsumi | |
| 5,144,448 A | 9/1992 | Hornbaker | |
| 5,629,524 A * | 5/1997 | Stettner et al. | 250/370.09 |
| 5,808,350 A | 9/1998 | Jack et al. | |
| 5,832,312 A | 11/1998 | Rieger et al. | |
| 5,880,691 A | 3/1999 | Fossum et al. | |
| 5,933,190 A | 8/1999 | Dierickx et al. | |
| 5,973,844 A | 10/1999 | Burger | |
| 6,002,743 A | 12/1999 | Telymonde | |
| 6,034,690 A | 3/2000 | Gallery et al. | |
| 6,069,351 A * | 5/2000 | Mack | 348/302 |
| 6,069,365 A | 5/2000 | Chow et al. | |
| 6,124,974 A | 9/2000 | Burger | |
| 6,137,535 A | 10/2000 | Meyers | |
| 6,141,048 A | 10/2000 | Meyers | |
| 6,358,862 B1 | 3/2002 | Ireland et al. | |
| 6,603,513 B1 | 8/2003 | Berezin | |
| 6,611,289 B1 | 8/2003 | Yu | |
| 6,627,896 B1 * | 9/2003 | Hashimoto et al. | 348/E5.073 |
| 6,635,941 B2 | 10/2003 | Suda | |
| 6,671,399 B1 | 12/2003 | Berestov | |
| 6,750,904 B1 | 6/2004 | Lambert | |
| 6,765,617 B1 | 7/2004 | Tangen et al. | |
| 6,771,833 B1 | 8/2004 | Edgar | |
| 6,774,941 B1 | 8/2004 | Boisvert et al. | |
| 6,879,735 B1 | 4/2005 | Portniaguine et al. | |
| 6,903,770 B1 | 6/2005 | Kobayashi et al. | |
| 6,909,121 B2 | 6/2005 | Nishikawa | |
| 6,958,862 B1 | 10/2005 | Joseph et al. | |
| 7,085,409 B2 | 8/2006 | Sawhney et al. | |
| 7,199,348 B2 | 4/2007 | Olsen et al. | |
| 7,262,799 B2 | 8/2007 | Suda | |
| 7,292,735 B2 | 11/2007 | Blake et al. | |
| 7,295,697 B1 | 11/2007 | Satoh | |
| 7,391,572 B2 | 6/2008 | Jacobowitz et al. | |
| 7,606,484 B1 | 10/2009 | Richards et al. | |
| 7,633,511 B2 | 12/2009 | Shum et al. | |
| 7,657,090 B2 | 2/2010 | Omatsu et al. | |
| 7,675,681 B2 | 3/2010 | Tomikawa et al. | |
| 7,706,634 B2 | 4/2010 | Schmitt et al. | |
| 7,723,662 B2 | 5/2010 | Levoy et al. | |
| 8,013,904 B2 | 9/2011 | Tan et al. | |
| 8,027,531 B2 | 9/2011 | Wilburn et al. | |
| 8,044,994 B2 | 10/2011 | Vetro et al. | |
| 8,077,245 B2 | 12/2011 | Adamo et al. | |
| 8,106,949 B2 | 1/2012 | Tan et al. | |
| 8,126,279 B2 | 2/2012 | Marcellin et al. | |
| 8,131,097 B2 | 3/2012 | Lelescu et al. | |
| 8,189,089 B1 | 5/2012 | Georgiev | |
| 8,213,711 B2 | 7/2012 | Tam | |
| 8,231,814 B2 | 7/2012 | Duparre | |
| 8,294,099 B2 * | 10/2012 | Blackwell, Jr. | 250/332 |
| 8,305,456 B1 | 11/2012 | McMahon | |
| 8,315,476 B1 | 11/2012 | Georgiev et al. | |
| 8,345,144 B1 | 1/2013 | Georgiev et al. | |
| 8,360,574 B2 | 1/2013 | Ishak et al. | |
| 8,406,562 B2 | 3/2013 | Bassi et al. | |
| 8,514,491 B2 | 8/2013 | Duparre | |
| 8,541,730 B2 * | 9/2013 | Inuiya | 250/208.1 |
| 8,542,933 B2 | 9/2013 | Venkataraman et al. | |
| 8,692,893 B2 | 4/2014 | McMahon | |
| 2001/0005225 A1 | 6/2001 | Clark et al. | |
| 2001/0038387 A1 | 11/2001 | Tomooka et al. | |
| 2002/0012056 A1 | 1/2002 | Trevino | |
| 2002/0027608 A1 | 3/2002 | Johnson | |
| 2002/0063807 A1 | 5/2002 | Margulis | |
| 2002/0087403 A1 | 7/2002 | Meyers et al. | |
| 2002/0089596 A1 | 7/2002 | Suda | |
| 2002/0094027 A1 | 7/2002 | Sato et al. | |
| 2002/0101528 A1 | 8/2002 | Lee | |
| 2002/0113867 A1 | 8/2002 | Takigawa et al. | |
| 2002/0113888 A1 | 8/2002 | Sonoda et al. | |
| 2002/0163054 A1 | 11/2002 | Suda | |
| 2002/0167537 A1 | 11/2002 | Trajkovic | |
| 2002/0177054 A1 | 11/2002 | Saitoh et al. | |
| 2003/0124763 A1 | 7/2003 | Fan et al. | |
| 2003/0140347 A1 | 7/2003 | Varsa | |
| 2003/0179418 A1 | 9/2003 | Wengender et al. | |
| 2003/0211405 A1 | 11/2003 | Venkataraman | |
| 2004/0008271 A1 | 1/2004 | Hagimori et al. | |
| 2004/0012689 A1 | 1/2004 | Tinnerino | |
| 2004/0047274 A1 | 3/2004 | Amanai | |
| 2004/0050104 A1 | 3/2004 | Ghosh et al. | |
| 2004/0056966 A1 | 3/2004 | Schechner et al. | |
| 2004/0100570 A1 | 5/2004 | Shizukuishi | |
| 2004/0114807 A1 | 6/2004 | Lelescu et al. | |
| 2004/0165090 A1 | 8/2004 | Ning | |
| 2004/0170340 A1 | 9/2004 | Tipping et al. | |
| 2004/0174439 A1 | 9/2004 | Upton | |
| 2004/0207836 A1 | 10/2004 | Chhibber et al. | |
| 2004/0213449 A1 | 10/2004 | Safaee-Rad et al. | |
| 2004/0234873 A1 | 11/2004 | Venkataraman | |
| 2004/0251509 A1 | 12/2004 | Choi | |
| 2005/0006477 A1 | 1/2005 | Patel | |
| 2005/0012035 A1 | 1/2005 | Miller | |
| 2005/0036778 A1 | 2/2005 | DeMonte | |
| 2005/0048690 A1 | 3/2005 | Yamamoto | |
| 2005/0068436 A1 | 3/2005 | Fraenkel et al. | |
| 2005/0132098 A1 | 6/2005 | Sonoda et al. | |
| 2005/0134712 A1 | 6/2005 | Gruhlke et al. | |
| 2005/0151759 A1 | 7/2005 | Gonzalez-Banos et al. | |
| 2005/0205785 A1 | 9/2005 | Hornback et al. | |
| 2005/0219363 A1 | 10/2005 | Kohler | |
| 2005/0225654 A1 | 10/2005 | Feldman et al. | |
| 2005/0286612 A1 | 12/2005 | Takanashi | |
| 2006/0002635 A1 | 1/2006 | Nestares et al. | |
| 2006/0023314 A1 | 2/2006 | Boettiger et al. | |
| 2006/0033005 A1 | 2/2006 | Jerdev et al. | |
| 2006/0038891 A1 | 2/2006 | Okutomi et al. | |
| 2006/0054780 A1 | 3/2006 | Garrood et al. | |
| 2006/0054782 A1 * | 3/2006 | Olsen et al. | 250/208.1 |
| 2006/0072029 A1 | 4/2006 | Miyatake et al. | |
| 2006/0087747 A1 | 4/2006 | Ohzawa et al. | |
| 2006/0098888 A1 | 5/2006 | Morishita | |
| 2006/0125936 A1 | 6/2006 | Gruhike et al. | |
| 2006/0138322 A1 | 6/2006 | Costello et al. | |
| 2006/0159369 A1 | 7/2006 | Young | |
| 2006/0176566 A1 | 8/2006 | Boettiger et al. | |
| 2006/0187338 A1 | 8/2006 | May et al. | |
| 2006/0210186 A1 | 9/2006 | Berkner | |
| 2006/0243889 A1 | 11/2006 | Farnworth et al. | |
| 2006/0251410 A1 | 11/2006 | Trutna | |
| 2006/0274174 A1 | 12/2006 | Tewinkle | |
| 2007/0002159 A1 | 1/2007 | Olsen et al. | |
| 2007/0024614 A1 | 2/2007 | Tam | |
| 2007/0040922 A1 | 2/2007 | McKee et al. | |
| 2007/0041391 A1 | 2/2007 | Lin et al. | |
| 2007/0052825 A1 | 3/2007 | Cho | |
| 2007/0083114 A1 | 4/2007 | Yang et al. | |
| 2007/0085917 A1 | 4/2007 | Kobayashi | |
| 2007/0102622 A1 | 5/2007 | Olsen et al. | |
| 2007/0127831 A1 | 6/2007 | Venkataraman | |
| 2007/0139333 A1 | 6/2007 | Sato et al. | |
| 2007/0146511 A1 | 6/2007 | Kinoshita et al. | |
| 2007/0159541 A1 | 7/2007 | Sparks et al. | |
| 2007/0160310 A1 | 7/2007 | Tanida et al. | |
| 2007/0171290 A1 | 7/2007 | Kroger | |
| 2007/0211164 A1 | 9/2007 | Olsen et al. | |
| 2007/0216765 A1 | 9/2007 | Wong et al. | |
| 2007/0228256 A1 | 10/2007 | Mentzer | |
| 2007/0257184 A1 | 11/2007 | Olsen et al. | |
| 2007/0258006 A1 | 11/2007 | Olsen et al. | |
| 2007/0258706 A1 | 11/2007 | Raskar et al. | |
| 2007/0268374 A1 | 11/2007 | Robinson | |
| 2007/0296835 A1 | 12/2007 | Olsen et al. | |
| 2008/0019611 A1 | 1/2008 | Larkin | |
| 2008/0025649 A1 | 1/2008 | Liu et al. | |
| 2008/0030597 A1 | 2/2008 | Olsen et al. | |
| 2008/0043095 A1 | 2/2008 | Vetro et al. | |
| 2008/0043096 A1 | 2/2008 | Vetro et al. | |

(56) References Cited

U.S. PATENT DOCUMENTS

| | | | |
|---|---|---|---|
| 2008/0080028 A1 | 4/2008 | Bakin et al. | |
| 2008/0084486 A1 | 4/2008 | Enge et al. | |
| 2008/0088793 A1 | 4/2008 | Sverdrup et al. | |
| 2008/0118241 A1 | 5/2008 | Tekolste et al. | |
| 2008/0131019 A1 | 6/2008 | Ng | |
| 2008/0131107 A1* | 6/2008 | Ueno | 396/50 |
| 2008/0151097 A1 | 6/2008 | Chen et al. | |
| 2008/0152215 A1 | 6/2008 | Horie et al. | |
| 2008/0152296 A1 | 6/2008 | Oh et al. | |
| 2008/0193026 A1 | 8/2008 | Horie et al. | |
| 2008/0218610 A1 | 9/2008 | Chapman et al. | |
| 2008/0219654 A1 | 9/2008 | Border et al. | |
| 2008/0247638 A1 | 10/2008 | Tanida et al. | |
| 2008/0247653 A1 | 10/2008 | Moussavi et al. | |
| 2009/0050946 A1 | 2/2009 | Duparre et al. | |
| 2009/0052743 A1 | 2/2009 | Techmer | |
| 2009/0060281 A1 | 3/2009 | Tanida et al. | |
| 2009/0086074 A1 | 4/2009 | Li et al. | |
| 2009/0091806 A1* | 4/2009 | Inuiya | 358/482 |
| 2009/0102956 A1 | 4/2009 | Georgiev | |
| 2009/0109306 A1 | 4/2009 | Shan et al. | |
| 2009/0167922 A1 | 7/2009 | Perlman et al. | |
| 2009/0179142 A1 | 7/2009 | Duparre et al. | |
| 2009/0180021 A1 | 7/2009 | Kikuchi et al. | |
| 2009/0200622 A1 | 8/2009 | Tai et al. | |
| 2009/0207235 A1 | 8/2009 | Francini et al. | |
| 2009/0225203 A1 | 9/2009 | Tanida et al. | |
| 2009/0237520 A1* | 9/2009 | Kaneko et al. | 348/222.1 |
| 2009/0268192 A1 | 10/2009 | Koenck et al. | |
| 2009/0268983 A1* | 10/2009 | Stone et al. | 348/218.1 |
| 2009/0284651 A1 | 11/2009 | Srinivasan | |
| 2009/0297056 A1 | 12/2009 | Lelescu et al. | |
| 2009/0302205 A9 | 12/2009 | Olsen et al. | |
| 2009/0323195 A1 | 12/2009 | Hembree et al. | |
| 2009/0324118 A1 | 12/2009 | Maslov et al. | |
| 2010/0002126 A1 | 1/2010 | Wenstrand et al. | |
| 2010/0002313 A1 | 1/2010 | Duparre et al. | |
| 2010/0002314 A1 | 1/2010 | Duparre | |
| 2010/0053342 A1 | 3/2010 | Hwang et al. | |
| 2010/0053600 A1* | 3/2010 | Tanida et al. | 356/124 |
| 2010/0060746 A9 | 3/2010 | Olsen et al. | |
| 2010/0086227 A1 | 4/2010 | Sun et al. | |
| 2010/0097491 A1 | 4/2010 | Farina et al. | |
| 2010/0103259 A1 | 4/2010 | Tanida et al. | |
| 2010/0103308 A1 | 4/2010 | Butterfield et al. | |
| 2010/0118127 A1 | 5/2010 | Nam et al. | |
| 2010/0142839 A1 | 6/2010 | Lakus-Becker | |
| 2010/0157073 A1 | 6/2010 | Kondo et al. | |
| 2010/0177411 A1 | 7/2010 | Hegde et al. | |
| 2010/0195716 A1 | 8/2010 | Klein et al. | |
| 2010/0201834 A1 | 8/2010 | Maruyama et al. | |
| 2010/0208100 A9 | 8/2010 | Olsen, et al. | |
| 2010/0220212 A1 | 9/2010 | Perlman et al. | |
| 2010/0231285 A1 | 9/2010 | Boomer et al. | |
| 2010/0244165 A1 | 9/2010 | Lake et al. | |
| 2010/0265385 A1 | 10/2010 | Knight et al. | |
| 2010/0281070 A1 | 11/2010 | Chan et al. | |
| 2011/0001037 A1 | 1/2011 | Tewinkle | |
| 2011/0032370 A1 | 2/2011 | Ludwig | |
| 2011/0043661 A1 | 2/2011 | Podoleanu | |
| 2011/0043665 A1 | 2/2011 | Ogasahara | |
| 2011/0043668 A1 | 2/2011 | McKinnon et al. | |
| 2011/0069189 A1 | 3/2011 | Venkataraman et al. | |
| 2011/0080487 A1 | 4/2011 | Venkataraman et al. | |
| 2011/0122308 A1 | 5/2011 | Duparre | |
| 2011/0153248 A1 | 6/2011 | Gu et al. | |
| 2011/0211824 A1 | 9/2011 | Georgiev et al. | |
| 2011/0221658 A1 | 9/2011 | Haddick et al. | |
| 2011/0241234 A1 | 10/2011 | Duparre | |
| 2011/0242342 A1 | 10/2011 | Goma et al. | |
| 2011/0242355 A1 | 10/2011 | Goma et al. | |
| 2011/0242356 A1 | 10/2011 | Aleksic et al. | |
| 2011/0279721 A1 | 11/2011 | McMahon | |
| 2011/0285866 A1 | 11/2011 | Bhrugumalla et al. | |
| 2011/0310980 A1 | 12/2011 | Mathew | |
| 2012/0012748 A1 | 1/2012 | Pain et al. | |
| 2012/0026342 A1 | 2/2012 | Yu et al. | |
| 2012/0044372 A1 | 2/2012 | Côté et al. | |
| 2012/0069235 A1 | 3/2012 | Imai | |
| 2012/0113413 A1 | 5/2012 | Miahczylowicz-Wolski et al. | |
| 2012/0147205 A1 | 6/2012 | Lelescu et al. | |
| 2012/0198677 A1 | 8/2012 | Duparre | |
| 2012/0249550 A1 | 10/2012 | Akeley et al. | |
| 2012/0287291 A1 | 11/2012 | McMahon | |
| 2012/0314033 A1 | 12/2012 | Lee et al. | |
| 2013/0003184 A1 | 1/2013 | Duparre | |
| 2013/0010073 A1 | 1/2013 | Do | |
| 2013/0050504 A1 | 2/2013 | Safaee-Rad et al. | |
| 2013/0057710 A1 | 3/2013 | McMahon et al. | |
| 2013/0070060 A1 | 3/2013 | Chatterjee | |
| 2013/0077880 A1 | 3/2013 | Venkataraman et al. | |
| 2013/0077882 A1 | 3/2013 | Venkataraman et al. | |
| 2013/0088637 A1 | 4/2013 | Duparre | |
| 2013/0120605 A1 | 5/2013 | Georgiev et al. | |
| 2013/0128068 A1 | 5/2013 | Georgiev et al. | |
| 2013/0128069 A1 | 5/2013 | Georgiev et al. | |
| 2013/0128087 A1 | 5/2013 | Georgiev et al. | |
| 2013/0147979 A1 | 6/2013 | McMahon et al. | |
| 2013/0215108 A1 | 8/2013 | McMahon et al. | |
| 2013/0265459 A1 | 10/2013 | Duparre et al. | |
| 2014/0132810 A1 | 5/2014 | McMahon | |
| 2014/0218546 A1 | 8/2014 | McMahon | |

FOREIGN PATENT DOCUMENTS

| | | |
|---|---|---|
| JP | 2006033493 A | 2/2006 |
| JP | 2007520107 A | 7/2007 |
| JP | 2011109484 A | 6/2011 |
| JP | 2013526801 A | 6/2013 |
| WO | 2007083579 A1 | 7/2007 |
| WO | 2009151903 A2 | 12/2009 |
| WO | 2011063347 A2 | 5/2011 |
| WO | 2011116203 A1 | 9/2011 |
| WO | 2011143501 A1 | 11/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012082904 A1 | 6/2012 |
| WO | 2012/155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014078443 A1 | 5/2014 |

OTHER PUBLICATIONS

Written Opinion for International Application No. PCT/US11/36349, mailed Aug. 22, 2011, 8 pgs.

Search Report and Written Opinion for International Application PCT/US11/36349, mailed Aug. 22, 2011, 12 pgs.

International Search Report and Written Opinion for International Application PCT/US2009/044687, completed Jan. 5, 2010, 13 pgs.

"International Search Report and Written Opinion for International Application PCT/US2012/37670, Mailed Jul. 18, 2012", International Filing Date May 11, 2012, Search Completed Jul. 5, 2012,9.

Chan et al., "Extending the Depth of Field in a Compound-Eye Imaging System with Super-Resolution Reconstruction", Proceedings—International Conference on Pattern Recognition, 2006, vol. 3, pp. 623-626.

Chan et al., "Investigation of Computational Compound-Eye Imaging System with Super-Resolution Reconstruction", IEEE, ISASSP 2006, pp. 1177-1180.

(56) References Cited

OTHER PUBLICATIONS

Chan et al., "Super-resolution reconstruction in a computational compound-eye imaging system", Multidim Syst Sign Process, 2007, vol. 18, pp. 83-101.
Farrell et al., "Resolution and Light Sensitivity Tradeoff with Pixel Size", Proceedings of the SPIE Electronic Imaging 2006 Conference, 2006, vol. 6069, 8 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Kitamura et al., "Reconstruction of a high-resolution image on a compound-eye image-capturing system", Applied Optics, Mar. 10, 2004, vol. 43, No. 8, pp. 1719-1727.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Liu et al., "Virtual View Reconstruction Using Temporal Information", 2012 IEEE International Conference on Multimedia and Expo, 2012, pp. 115-120.
Ng, "Digital Light Field Photography", Thesis, Jul. 2006, 203 pgs.
Nitta et al., "Image reconstruction for thin observation module by bound optics by using the iterative backprojection method", Applied Optics, May 1, 2006, vol. 45, No. 13, pp. 2893-2900.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Wetzstein et al., "Computational Plenoptic Imaging", Computer Graphics Forum, 2011, vol. 30, No. 8, pp. 2397-2426.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., , "The Light Field Video Camera", Proceedings of Media Processors 2002, SPIE Electronic Imaging, 2002, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12, 2005.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs., Aug. 2009.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Kang et al., "Handling Occlusions inn Dense Multi-View Stereo", Computer Vision and Pattern Recognition, 2001, vol. 1, pp. I-103-I-110.
Krishnamurthy et al., "Compression and Transmission of Depth Maps for Image-Based Rendering", Image Processing, 2001, pp. 828-831.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Muehlebach, "Camera Auto Exposure Control for VSLAM Applications", Studies on Mechatronics, 2010.
Nayar, "Computational Cameras: Redefining the Image", IEEE Computer Society, Aug. 2006, pp. 30-38.
Ng et al., "Super-Resolution Image Restoration from Blurred Low-Resolution Images", Journal of Mathematical Imaging and Vision, 2005, vol. 23, pp. 367-378.
Nomura et al., "Scene Collages and Flexible Camera Arrays", Proceedings of Eurographics Symposium on Rendering, 2007, 12 pgs.

(56) References Cited

OTHER PUBLICATIONS

Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Takeda et al., "Super-resolution Without Explicit Subpixel Motion Estimation", IEEE Transaction on Image Processing, Sep. 2009, vol. 18, No. 9, pp. 1958-1975.
Vuong et al., "A New Auto Exposure and Auto White-Balance Algorithm to Detect High Dynamic Range Conditions Using CMOS Technology", Oct. 22-24, 2008.
Wheeler et al., "Super-Resolution Image Synthesis Using Projections Onto Convex Sets in the Frequency Domain", Proc. SPIE, 2005, 5674, 12 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
International Search Report and Written Opinion for International Application No. PCT/US13/46002, Search Completed Nov. 13, 2013, Mailed Nov. 29, 2013, 7 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, International Filing Date Nov. 13, 2013, Search Completed Mar. 14, 2014, Mailed Apr. 14, 2014, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, , completed Dec. 17, 2012, 8 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Boye et al., "Comparison of Subpixel Image Registration Algorithms", Proc. of SPIE-IS&T Electronic Imaging, vol. 7246, pp. 72460X-1-72460X-9, 2009.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages), 2001.

(56) References Cited

OTHER PUBLICATIONS

Chan et al., "Super-resolution reconstruction in a computational compound-eye imaging system", Multidim. Syst. Sign Process, 2007, vol. 18, pp. 83-101.

Drouin et al., "Fast Multiple-Baseline Stereo with Occlusion", Proceedings of the Fifth International Conference on 3-D Digital Imaging and Modeling, 2005, 8 pgs.

Drouin et al., "Geo-Consistency for Wide Multi-Camera Stereo", Proceedings of the 2005 IEEE Computer Society Conference on Computer Vision and Pattern Recognition, 2005, 8 pgs.

Drouin et al., "Improving Border Localization of Multi-Baseline Stereo Using Border-Cut", International Journal of Computer Vision, Jul. 2009, vol. 83, Issue 3, 8 pgs.

\* cited by examiner

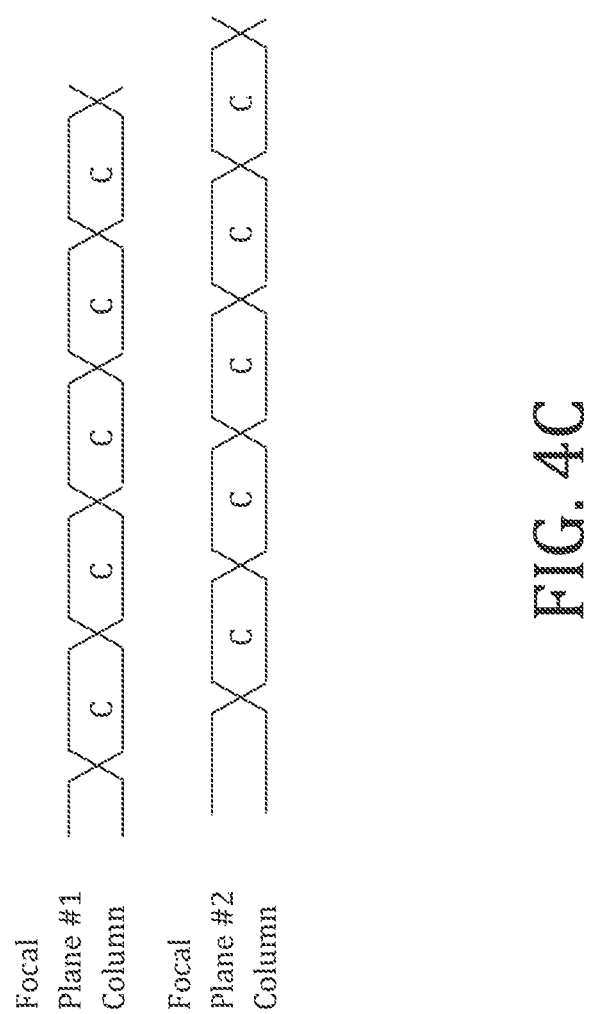

IMAGER ARRAY INTERFACES

RELATED APPLICATION

This application claims priority to U.S. patent application Ser. No. 61/334,011 filed on May 12, 2010, which is incorporated by reference herein in its entirety.

FIELD OF THE INVENTION

The present invention relates generally to imagers and more specifically to imager arrays used in array cameras.

BACKGROUND OF THE INVENTION

A sensor used in a conventional single sensor camera, typically includes a row controller and one or more column read-out circuits. In the context of the array of pixels in an imager, the term "row" is typically used to refer to a group of pixels that share a common control line(s) and the term "column" is a group of pixels that share a common read-out line(s). A number of array camera designs have been proposed that use either an array of individual cameras/sensors or a lens array focused on a single focal plane sensor. When multiple separate cameras are used in the implementation of an array camera, each camera has a separate I/O path and the camera controllers are typically required to be synchronized in some way. When a lens array focused on a single focal plane sensor is used to implement an array camera, the sensor is typically a conventional sensor similar to that used in a conventional camera. As such, the sensor does not possess the ability to independently control the pixels within the image circle of each lens in the lens array.

SUMMARY OF THE INVENTION

Systems and methods are disclosed in which an imager array is implemented as a monolithic integrated circuit in accordance with embodiments of the invention. In many embodiments, the imager array includes a plurality of imagers that are each independently controlled by control logic within the imager array and the image data captured by each imager is output from the imager array using a common I/O path. In a number of embodiments, the pixels of each imager are backside illuminated and the bulk silicon of the imager array is thinned to different depths in the regions corresponding to different imagers in accordance with the spectral wavelengths sensed by each imager.

One embodiment includes a plurality of focal planes, where each focal plane comprises a two dimensional arrangement of pixels having at least two pixels in each dimension and each focal plane is contained within a region of the imager array that does not contain pixels from another focal plane, control circuitry configured to control the capture of image information by the pixels within the focal planes, where the control circuitry is configured so that the capture of image information by the pixels in at least two of the focal planes is separately controllable, sampling circuitry configured to convert pixel outputs into digital pixel data and output interface circuitry configured to transmit pixel data via an output interface.

A further embodiment of the invention includes the imager array includes M×N focal planes, the output interface array includes less than M×N output ports, and the control circuitry is configured to time multiplex the pixel data onto the output ports of the output interface.

In another embodiment, the control circuitry further comprises memory configured to buffer pixel data from the plurality of focal planes until a time-slot is available on an output port of the output interface to transmit the pixel data.

In a still further embodiment, the control circuitry is configured to insert codes between the pixel data transmitted via the output interface, where the codes provide information identifying a focal plane.

In still another embodiment, the control circuitry is configured to insert codes between the pixel data transmitted via the output interface, where the codes provide information identifying at least one row of pixels within a focal plane.

In a yet further embodiment, the control circuitry is configured to insert codes between the pixel data transmitted via the output interface, where the codes provide information identifying at least one column of pixels within a focal plane.

In yet another embodiment, the control circuitry is configured to insert codes between the pixel data transmitted via the output interface, where the codes provide information identifying the relative time of pixel data capture.

In a further embodiment again, the codes provide information identifying the relative start time of the pixel data capture.

In another embodiment again, the codes provide information identifying the relative end time of the pixel data capture.

In a further additional embodiment, the control circuitry further comprises a counter and the codes that provide information identifying the relative time of pixel data capture are generated using the counter.

In another additional embodiment, the control circuitry is configured to insert codes between the pixel data transmitted via the output interface, where the codes provide information concerning operating parameters of the imager array.

In a still yet further embodiment, the codes provide the integration time of each focal plane.

In still yet another embodiment, the codes provide the gain of each focal plane.

In a still further embodiment again, the output interface circuitry is configured to insert a frame blanking interval between transmission of pixel data via the output interface.

In still another embodiment again, the output interface circuitry is further configured to insert a line blanking interval between transmission of lines of pixel data via the output interface.

In a still further additional embodiment, the output interface circuitry is configured to transform the pixel data by performing bit reductions.

An embodiment of the method of the invention includes separately capturing pixel data using an imager array having a plurality of focal planes, where each focal plane comprises a two dimensional arrangement of pixels having at least two pixels in each dimension and each focal plane is contained within a region of the imager array that does not contain pixels from another focal plane, during the capture of the pixel data, buffering portions of the captured pixel data within memory in the imager array, and transmitting the buffered pixel data via an output interface in the imager array when a time-slot is available on an output port.

A further embodiment of the invention also includes using control circuitry on the imager array to insert codes between the pixel data transmitted via the output interface, where the codes provide information identifying a focal plane.

Another embodiment of the invention also includes using control circuitry on the imager array to insert codes between the pixel data transmitted via the output interface, where the codes provide information identifying at least one row of pixels within a focal plane.

A still further embodiment of the invention also includes using control circuitry on the imager array to insert codes between the pixel data transmitted via the output interface, where the codes provide information identifying at least one of at least one column of pixels within a focal plane, the relative time of pixel data capture, the relative start time of the pixel data capture, the relative end time of the pixel data capture, the integration time of each focal plane, and the gain of each focal plane.

Still another embodiment of the invention also includes using control circuitry on the imager array to insert a line blanking interval between transmissions of buffered pixel data via the output interface.

A yet further embodiment of the invention also includes using control circuitry on the imager array to insert a frame blanking interval upon completion of the transmission of the captured pixel data.

BRIEF DESCRIPTION OF THE DRAWINGS

FIG. 4C illustrates the phase shifting of column circuit outputs from two focal planes read-out in accordance with an embodiment of the invention.

DETAILED DISCLOSURE OF THE INVENTION

Figure 1:
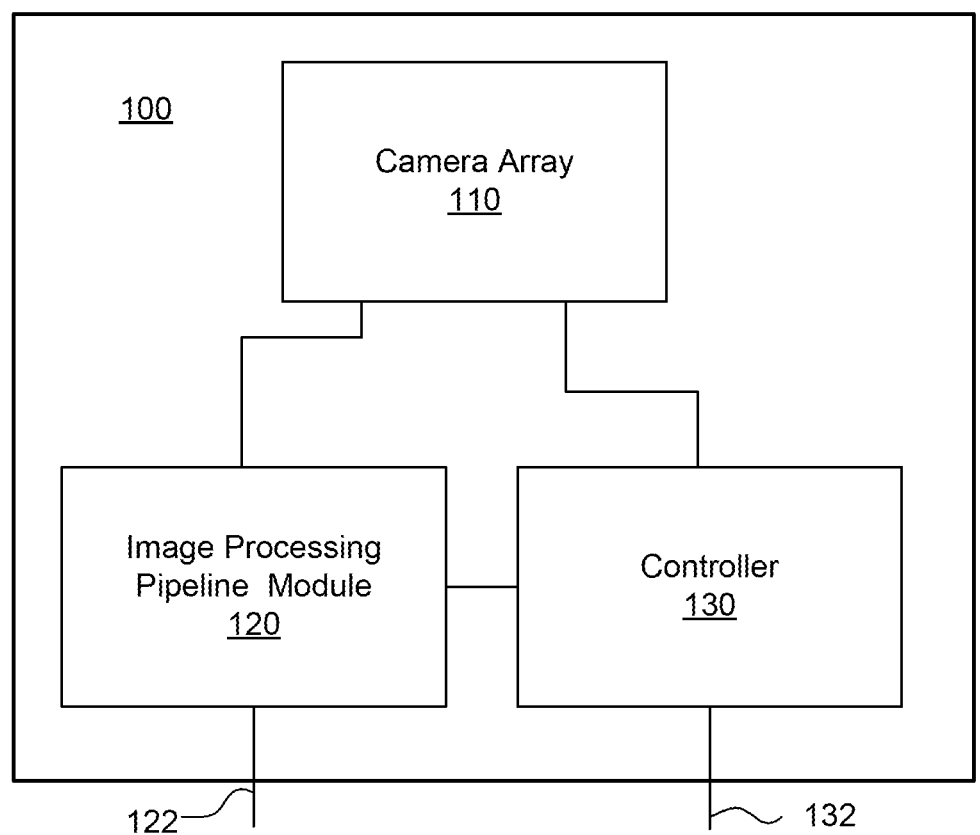
FIG. 1 is a block diagram of an array camera in accordance with an embodiment of the invention.

Turning now to the drawings, architectures for imager arrays configured for use in array cameras in accordance with embodiments of the invention are illustrated. In many embodiments, a centralized controller on a imager array enables fine control of the capture time of each focal plane in the array. The term focal plane describes a two dimensional arrangement of pixels. Focal planes in an imager array are typically non-overlapping (i.e. each focal plane is located within a separate region on the imager array). The term imager is used to describe the combination of a focal plane and the control circuitry that controls the capture of image information using the pixels within the focal plane. In a number of embodiments, the focal planes of the imager array can be separately triggered. In several embodiments, the focal planes of the imager array utilize different integration times tailored to the capture band of the pixels within each focal plane. The capture band of a pixel typically refers to a contiguous sub-band of the electromagnetic system to which a pixel is sensitive. In addition, the specialization of specific focal planes so that all or a majority of the pixels in the focal plane have the same capture band enables a number of pixel performance improvements and increases in the efficiency of utilization of peripheral circuitry within the imager array.

In a number of embodiments, the pixels of the imager array are backside illuminated and the substrate of the regions containing each of the focal planes are thinned to different depths depending upon the spectral wavelengths sensed by the pixels in each focal plane. In addition, the pixels themselves can be modified to improve the performance of the pixels with respect to specific capture bands. In many embodiments, the conversion gain, source follower gain and full well capacity of the pixels in each focal plane are determined to improve the performance of the pixels with respect to their specific capture bands.

In several embodiments, each focal plane possesses dedicated peripheral circuitry to control the capture of image information. In certain embodiments, the grouping of pixels intended to capture the same capture band into focal planes enables peripheral circuitry to be shared between the pixels. In many embodiments, the analog front end, analog to digital converter, and/or column read-out and control circuitry are shared between pixels within two or more focal planes.

In many embodiments, the imagers in an imager array can be placed in a lower power state to conserve power, which can be useful in operating modes that do not require all imagers to be used to generate the output image (e.g. lower resolution modes). In several embodiments, the pixels of imagers in the low power state are held with the transfer gate on so as to maintain the photodiode's depletion region at its maximum potential and carrier collection ability, thus minimizing the probability of photo-generated carriers generated in an inactive imager from migrating to the pixels of active imagers. Array cameras and imager arrays in accordance with embodiments of the invention are discussed further below.

1. Array Camera Architecture

An array camera architecture that can be used in a variety of array camera configurations in accordance with embodiments of the invention is illustrated in FIG. 1. The array camera 100 includes an imager array 110, which is connected to an image processing pipeline module 120 and to a controller 130.

The imager array 110 includes an M×N array of individual and independent focal planes, each of which receives light through a separate lens system. The imager array can also include other circuitry to control the capture of image data using the focal planes and one or more sensors to sense physical parameters. The control circuitry can control imaging and functional parameters such as exposure times, trigger times, gain, and black level offset. The control circuitry can also control the capture of image information by controlling read-out direction (e.g. top-to-bottom or bottom-to-top, and left-to-right or right-to-left). The control circuitry can also control read-out of a region of interest, horizontal sub-sampling, vertical sub-sampling, and/or charge-binning. In many embodiments, the circuitry for controlling imaging parameters may trigger each focal plane separately or in a synchronized manner. The imager array can include a variety of other sensors, including but not limited to, dark pixels to estimate dark current at the operating temperature. Imager arrays that can be utilized in array cameras in accordance with embodiments of the invention are disclosed in PCT Publication WO 2009/151903 to Venkataraman et al., the disclosure of which is incorporated herein by reference in its entirety. In a monolithic implementation, the imager array may be implemented using a monolithic integrated circuit. When an imager array in accordance with embodiments of the invention is implemented in a single sell-contained SOC chip or die, the imager array can be referred to as a imager array. The term imager array can be used to describe a semiconductor chip on which the imager array and associated control, support, and read-out electronics are integrated.

The image processing pipeline module 120 is hardware, firmware, software, or a combination thereof for processing the images received from the imager array 110. The image processing pipeline module 120 typically processes the multiple low resolution (LR) images captured by the camera array and produces a synthesized higher resolution image in accordance with an embodiment of the invention. In a number of embodiments, the image processing pipeline module 120 provides the synthesized image data via an output 122. Various image processing pipeline modules that can be utilized in a camera array in accordance with embodiments of the invention are disclosed in U.S. patent application Ser. No. 12/967,807 entitled "System and Methods for Synthesizing High Resolution Images Using Super-Resolution Processes" filed Dec. 14, 2010, the disclosure of which is incorporated by reference herein in its entirety.

The controller 130 is hardware, software, firmware, or a combination thereof for controlling various operation parameters of the imager array 110. In many embodiments, the controller 130 receives inputs 132 from a user or other external components and sends operation signals to control the imager array 110. The controller 130 can also send information to the image processing pipeline module 120 to assist processing of the LR images captured by the imager array 110.

Although a specific array camera architecture is illustrated in FIG. 1, alternative architectures for capturing a plurality of images of a scene using an imager array can also be utilized in accordance with embodiments of the invention. Operation of array cameras, imager array configurations, and processing multiple captured images of a scene in accordance with embodiments of the invention are discussed further below.

2. Imager Array Architectures

Figure 1A:
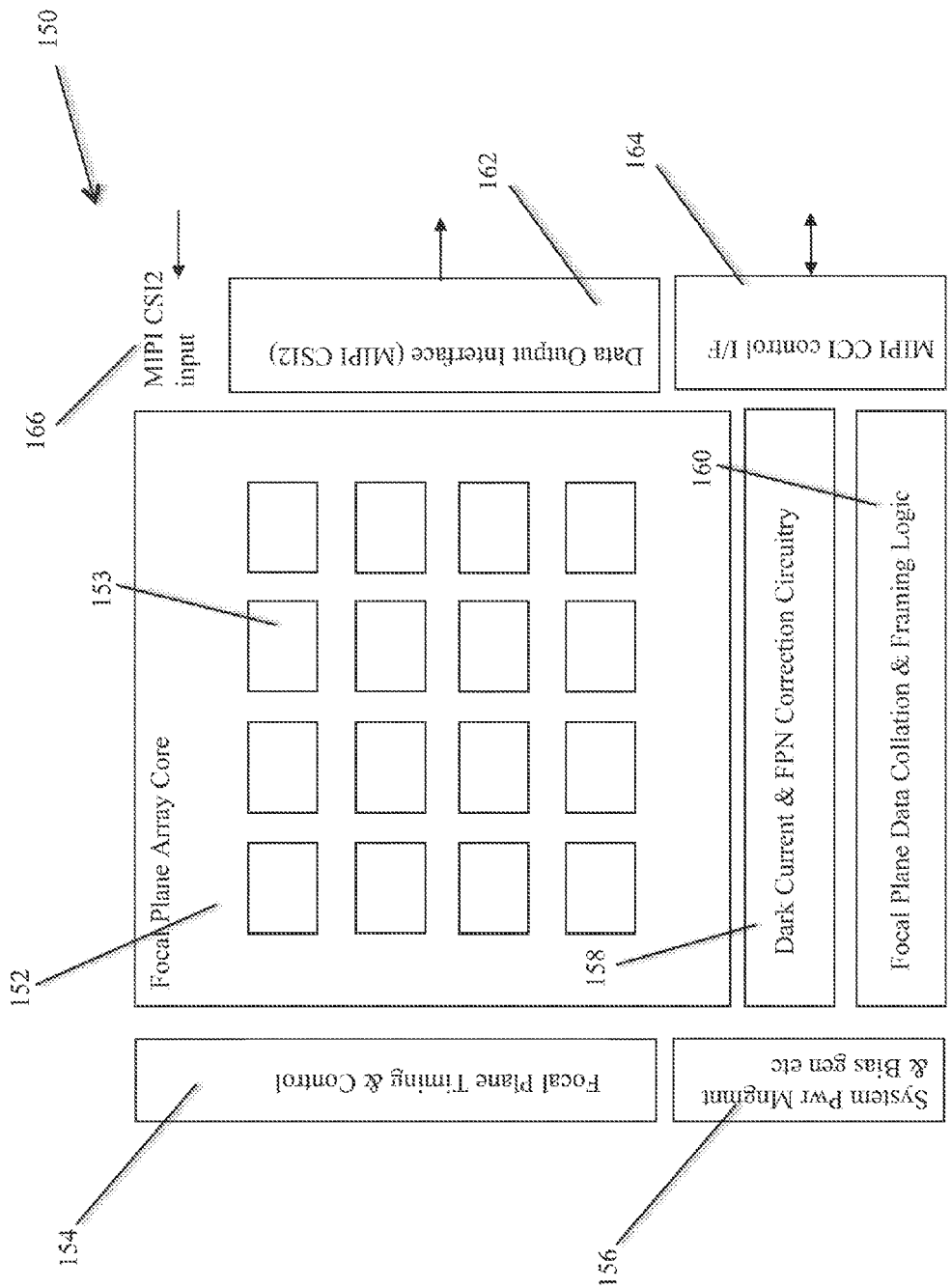
FIG. 1A is a block diagram of a monolithic imager array in accordance with an embodiment of the invention.

A imager array in accordance with an embodiment of the invention is illustrated in FIG. 1A. The imager array includes a focal plane array core 152 that includes an array of focal planes 153 and all analog signal processing, pixel level control logic, signaling, and analog-to-digital conversion circuitry. The imager array also includes focal plane timing and control circuitry 154 that is responsible for controlling the capture of image information using the pixels. In a number of embodiments, the focal plane timing and control circuitry utilizes reset and read-out signals to control the integration time of the pixels. In other embodiments, any of a variety of techniques can be utilized to control integration time of pixels and/or to capture image information using pixels. In many embodiments, the focal plane timing and control circuitry 154 provides flexibility of image information capture control, which enables features including (but not limited to) high dynamic range imaging, high speed video, and electronic image stabilization. In various embodiments, the imager array includes power management and bias generation circuitry 156. The power management and bias generation circuitry 156 provides current and voltage references to analog circuitry such as the reference voltages against which an ADC would measure the signal to be converted against. In many embodiments, the power management and bias circuitry also includes logic that turns off the current/voltage references to certain circuits when they are not in use for power saving reasons. In several embodiments, the imager array includes dark current and fixed pattern (FPN) correction circuitry 158 that increases the consistency of the black level of the image data captured by the imager array and can reduce the appearance of row temporal noise and column fixed pattern noise. In several embodiments, each focal plane includes reference pixels for the purpose of calibrating the dark current and FPN of the focal plane and the control circuitry can keep the reference pixels active when the rest of the pixels of the focal plane are powered down in order to increase the speed with which the imager array can be powered up by reducing the need for calibration of dark current and FPN. In many embodiments, the SOC imager includes focal plane framing circuitry 160 that packages the data captured from the focal planes into a container file and can prepare the captured image data for transmission. In several embodiments, the focal plane framing circuitry includes information identifying the focal plane and/or group of pixels from which the captured image data originated. In a number of embodiments, the imager array also includes an interface for transmission of captured image data to external devices. In the illustrated embodiment, the interface is a MIPI CSI 2 output interface supporting four lanes that can support read-out of video at 30 fps from the imager array and incorporating data output interface circuitry 162, interface control circuitry 164 and interface input circuitry 166. Typically, the bandwidth of each lane is optimized for the total number of pixels in the imager array and the desired frame rate. The use of various interfaces including the MIPI CSI 2 interface to transmit image data captured by an array of imagers within a imager array to an external device in accordance with embodiments of the invention is described in U.S. Provisional. Patent Application No. 61/484,920, entitled "Systems and Methods for Transmitting Array Camera Data", filed May 11, 2011, the disclosure of which is incorporated by reference herein in its entirety. Although specific components of a imager array architecture are discussed above with respect to FIG. 1A. As is discussed further below, any of a variety of imager arrays can be constructed in accordance with embodiments of the invention that enable the capture of images of a scene at a plurality of focal planes in accordance with embodiments of the invention. Accordingly, focal plane array cores and various components that can be included in imager arrays in accordance with embodiments of the invention are discussed further below.

3. Focal Plane Array Cores

Focal plan array cores in accordance with embodiments of the invention include an array of imagers and dedicated peripheral circuitry for capturing image data using the pixels in each focal plane. Imager arrays in accordance with embodiments of the invention can include focal plan array cores that are configured in any of a variety of different configurations appropriate to a specific application. For example, customizations can be made to a specific imager array designs including (but not limited to) with respect to the focal plane, the pixels, and the dedicated peripheral circuitry. Various focal plane, pixel designs, and peripheral circuitry that can be incorporated into focal plane array cores in accordance with embodiments of the invention are discussed below.

3.1. Formation of Focal Planes on an Imager Array

An imager array can be constructed in which the focal planes are formed from an array of pixel elements, where each focal plane is a sub-array of pixels. In embodiments where each sub-array has the same number of pixels, the imager array includes a total of K×L pixel elements, which are segmented in M×N sub-arrays of X×Y pixels, such that K=M×X, and L=N×Y. In the context of an imager array, each sub-array or focal plane can be used to generate a separate image of the scene. Each sub-array of pixels provides the same function as the pixels of a conventional imager (i.e. the imager in a camera that includes a single focal plane).

As is discussed further below, a imager array in accordance with embodiments of the invention can include a single controller that can separately sequence and control each focal plane. Having a common controller and I/O circuitry can provide important system advantages including lowering the cost of the system due to the use of less silicon area, decreasing power consumption due to resource sharing and reduced system interconnects, simpler system integration due to the host system only communicating with a single controller rather than M×N controllers and read-out I/O paths, simpler array synchronization due to the use of a common controller, and improved system reliability due to the reduction in the number of interconnects.

3.2. Layout of Imagers

Figure 2A:
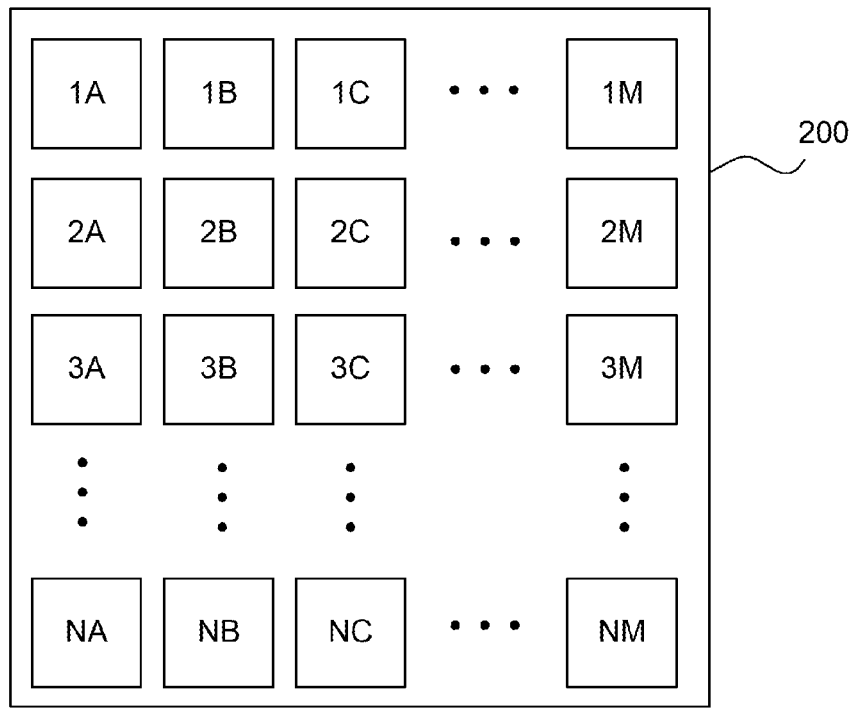
FIGS. 2A-2B illustrate imager configurations of imager arrays in accordance with embodiments of the invention.

As is disclosed in P.C.T. Publication WO 2009/151903 (incorporated by reference above), an imager array can include any N×M array of focal planes such as the imager array (200) illustrated in FIG. 2A. Each of the focal planes typically has an associated filter and/or optical elements and can image different wavelengths of light. In a number of embodiments, the imager array includes focal planes that sense red light (R), focal planes that sense green light (G), and focal planes that sense blue light (B). Although in several embodiments, one or more of the focal planes include pixels that are configured to capture different colors of light. In a number of embodiments, the pixels employ a Bayer filter pattern (or similar) pattern that enables different pixels within a focal plane to capture different colors of light. In several embodiments, a 2×2 imager array can include a focal plane where the pixels employ a Bayer filter pattern (or similar), a focal plane where the pixels are configured to capture blue light, a focal plane where the image is configured to capture green light, and a focal plane where the imager is configured to capture red light. Array cameras incorporating such sensor arrays can utilize the color information captured by the blue, green, and red focal planes to enhance the colors of the image captured using the focal plane that employs the Bayer filter. In other embodiments, the focal plane that employs the Bayer pattern is incorporated into an imager array that includes a two dimensional arrangement of focal planes where there are at least three focal planes in one of the dimensions. In a number of embodiments, there are at least three focal planes in both dimensions.

Figure 2B:
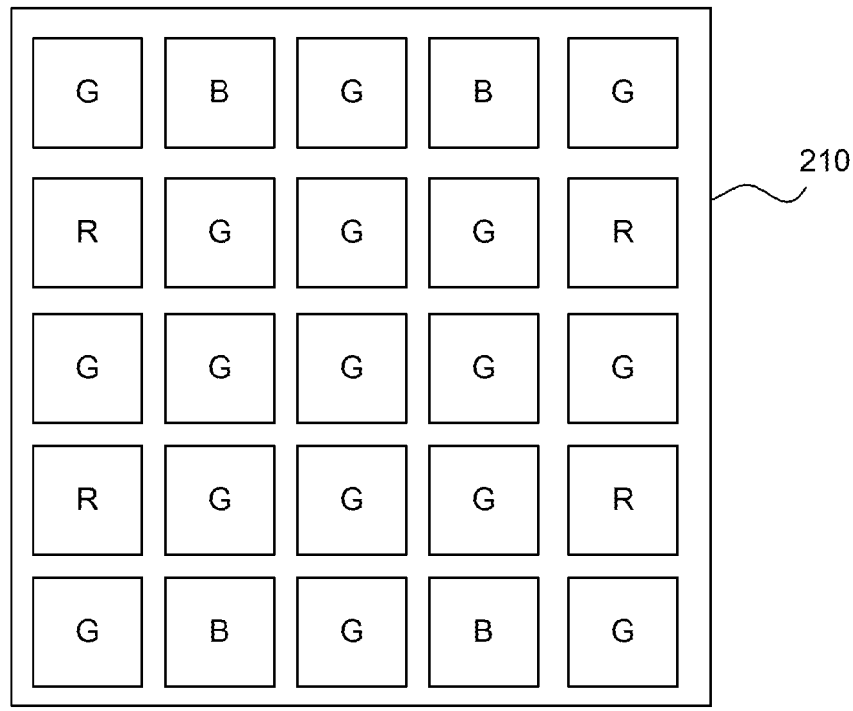

The human eye is more sensitive to green light than to red and blue light, therefore, an increase in the resolution of an image synthesized from the low resolution image data captured by a imager array can be achieved using an array that includes more focal planes that sense green light than focal planes that sense red or blue light. A 5×5 imager array (210) including 17 focal planes that sense green light (G), four focal planes that sense red light (R), and four focal planes that sense blue light (B) is illustrated in FIG. 2B. In several embodiments, the imager array also includes focal planes that sense near-IR wavelengths or extended-color wavelengths (i.e. spanning both color and near-IR wavelengths), which can be used to improve the performance of the array camera in low light conditions. In other embodiments, the 5×5 imager array includes at least 13 focal planes, at least 15 focal planes or at least 17 focal planes. In addition, the 5×5 imager array can include at least four focal planes that sense red light, and/or at least four focal planes that sense blue light. In addition, the number of focal planes that sense red light and the number of focal planes that sense blue light can be the same, but need not be the same. Indeed, several imager arrays in accordance with embodiments of the invention include different numbers of focal planes that sense red light and that sense blue light. In many embodiments, other arrays are utilized including (but not limited to) 3×2 arrays, 3×3 arrays, 3×4 arrays, 4×4 arrays, 4×5 arrays, 4×6 arrays, 5×5 arrays, 5×6 arrays, 6×6 arrays, and 3×7 arrays. In a number of embodiments, the imager array includes a two dimensional array of focal planes having at least three focal planes in one of the dimensions. In several embodiments, there are at least three focal plane in both dimensions of the array. In several embodiments, the array includes at least two focal planes having pixels configured to capture blue light, at least two focal planes having pixels configured to capture green light, and at least two focal planes having pixels configured to capture red light.

Additional imager array configurations are disclosed in U.S. patent application Ser. No. 12/952,106 entitled "Capturing and Process of Images Using Monolithic Camera Array with Heterogenous Imagers" to Venkataraman et al., the disclosure of which is incorporated by reference herein in its entirety.

Although specific imager array configurations are disclosed above, any of a variety of regular or irregular layouts of imagers including imagers that sense visible light, portions of the visible light spectrum, near-IR light, other portions of the spectrum and/or combinations of different portions of the spectrum can be utilized to capture images that provide one or more channels of information for use in SR processes in accordance with embodiments of the invention. The construction of the pixels of an imager in an imager array in accordance with an embodiment of the invention can depend upon the specific portions of the spectrum imaged by the imager. Different types of pixels that can be used in the focal planes of an imager array in accordance with embodiments of the invention are discussed below.

3.3. Pixel Design

Within an imager array that is designed for color or multispectral capture, each individual focal plane can be designated to capture a sub-band of the visible spectrum. Each focal plane can be optimized in various ways in accordance with embodiments of the invention based on the spectral band it is designated to capture. These optimizations are difficult to perform in a legacy Bayer pattern based image sensor since the pixels capturing their respective sub-band of the visible spectrum are all interleaved within the same pixel array. In many embodiments of the invention, backside illumination is used where the imager array is thinned to different depths depending upon the capture band of a specific focal plane. In a number of embodiments, the sizes of the pixels in the imager array are determined based upon the capture band of the specific imager. In several embodiments, the conversion gains, source follower gains, and full well capacities of groups of pixels within a focal plane are determined based upon the capture band of the pixels. The various ways in which pixels can vary between focal planes in a imager array depending upon the capture band of the pixel are discussed further below.

3.3.1. Backside Illuminated Imager Array with Optimized Thinning Depths

A traditional image sensor is illuminated from the front side where photons must first travel through a dielectric stack before finally arriving at the photodiode, which lies at the bottom of the dielectric stack in the silicon substrate. The dielectric stack exists to support metal interconnects within the device. Front side illumination suffers from intrinsically poor Quantum Efficiency (QE) performance (the ratio of generated carriers to incident photons), due to problems such as the light being blocked by metal structures within the pixel. Improvement is typically achieved through the deposition of micro-lens elements on top of the dielectric stack for each pixel so as to focus the incoming light in a cone that attempts to avoid the metal structures within the pixel.

Backside illumination is a technique employed in image sensor fabrication so as to improve the QE performance of imagers. In backside illumination (BSI), the silicon substrate bulk is thinned (usually with a chemical etch process) to allow photons to reach the depletion region of the photodiode through the backside of the silicon substrate. When light is incident on the backside of the substrate, the problem of aperturing by metal structures inherent in frontside illumination is avoided. However, the absorption depth of light in silicon is proportional to the wavelength such that the red photons penetrate much deeper than blue photons. If the thinning process does not remove sufficient silicon, the depletion region will be too deep to collect photo electrons generated from blue photons. If the thinning process removes too much silicon, the depletion region can be too shallow and red photons may travel straight though without interacting and generating carriers. Red photons could also be reflected from the front surface back and interact with incoming photons to create constructive and destructive interference due to minor differences in the thickness of the device. The effects caused by variations in the thickness of the device can be evident as fringing patterns and/or as spiky spectral. QE response.

In a conventional imager, a mosaic of color filters (typically a Bayer filter) is often used to provide RGB color capture. When a mosaic based color imager is thinned for BSI, the thinning depth is typically the same for all pixels since the processes used do not thin individual pixels to different depths. The common thinning depth of the pixels results in a necessary balancing of QE performance between blue wavelengths and red/near-IR wavelengths. A imager array in accordance with embodiments of the invention includes an array of imagers, where each pixel in a focal plane senses the same spectral wavelengths. Different focal planes can sense different sub-bands of the visible spectrum or indeed any sub-band of the electromagnetic spectrum for which the band-gap energy of silicon has a quantum yield gain greater than 0. Therefore, performance of an imager array can be improved by using BSI where the thinning depth for the pixels of a focal plane is chosen to match optimally the absorption depth corresponding to the wavelengths of light each pixel is designed to capture. In a number of embodiments, the silicon bulk material of the imager array is thinned to different thicknesses to match the absorption depth of each camera's capture band within the depletion region of the photodiode so as to maximize the QE.

Figure 5:
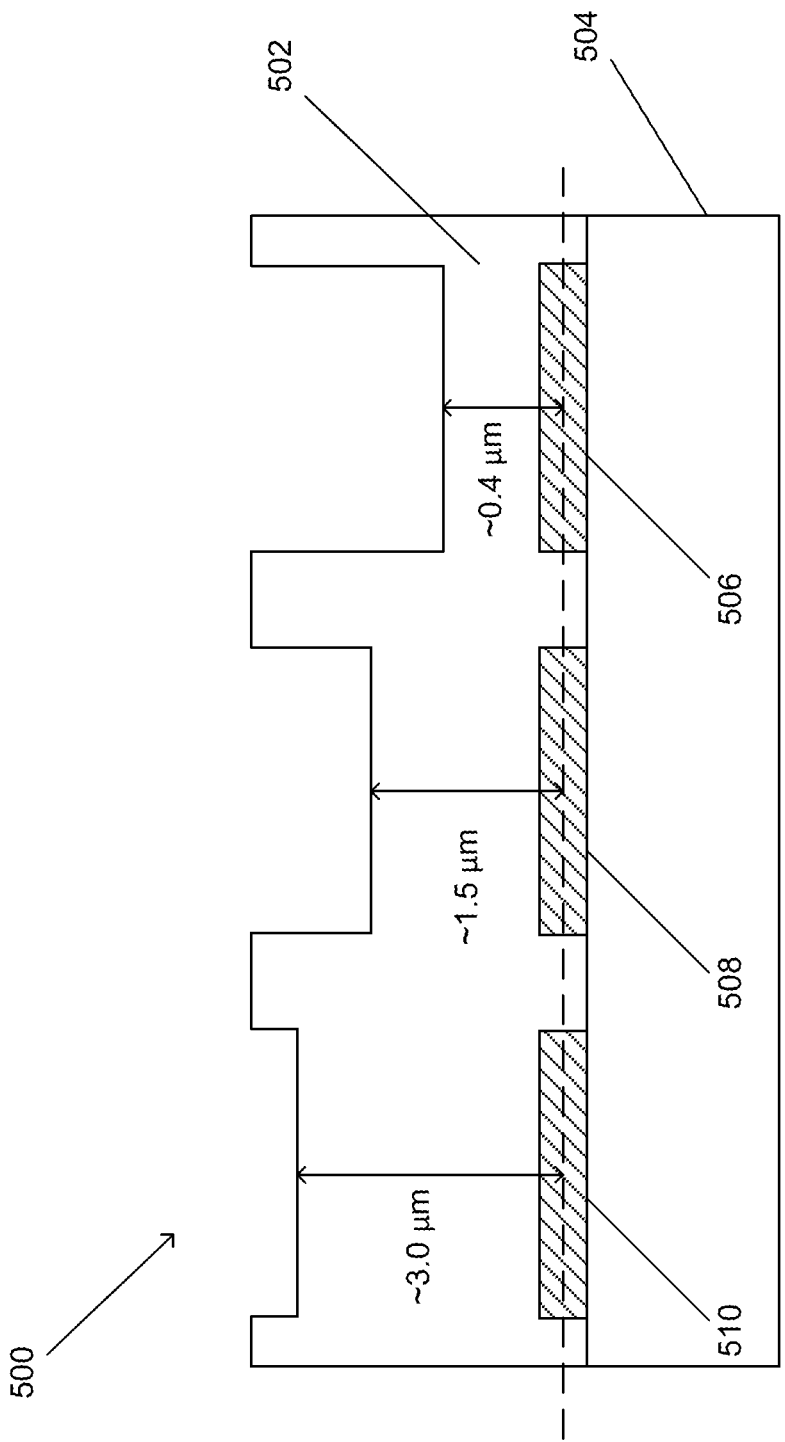
FIG. 5 illustrates a backside illuminated imager array with optimized thinning depths in accordance with an embodiment of the invention.

An imager array in which the silicon substrate is thinned to different depths in regions corresponding to focal planes (i.e. sub-arrays) that sense different spectral bandwidths in accordance with an embodiment of the invention is conceptually illustrated in FIG. 5. The imager array 500 includes a silicon substrate 502 on the front side of which a dielectric stack and metal interconnects 504 are formed. In the illustrated embodiment, the silicon substrate includes regions 506, 508, 510 in which the photodiodes of pixels forming a focal plane for sensing blue light, the photodiodes of pixels forming a focal plane for sensing green light, and the photodiodes of pixels forming a focal plane for sensing red light respectively are located. The backside of the silicon substrate is thinned to different depths in each region. In the illustrated embodiment, the substrate is thinned to correspond to the absorption depth of 450 nm wavelength light (i.e. approximately 0.4 µm) in the region 506 in which the photodiodes of pixels forming an imager for sensing blue light are located, the substrate is thinned to correspond to the absorption depth of 550 nm wavelength light (i.e. approximately 1.5 µm) in the region 508 in which the photodiodes of pixels forming an imager for sensing green light are located, and the substrate is thinned to correspond to the absorption depth of 640 nm wavelength light (i.e. approximately 3.0 µm) in the region 510 in which the photodiodes of pixels forming an imager for sensing red light are located. Although specific depths are shown in FIG. 5, other depths appropriate to the spectral wavelengths sensed by a specific imager and the requirements of the application can be utilized in accordance with embodiments of the invention. In addition, different thinning depths can also be used in array cameras that are not implemented using imager arrays in accordance with embodiments of the invention.

In many embodiments, the designation of color channels to each imager within the array is achieved via a first filtration of the incoming photons through a band-pass filter within the optical path of the photons to the photodiodes. In several embodiments, the thinning depth itself is used to create the designation of capture wavelengths since the depletion region depth defines the spectral. QE of each imager.

3.3.2. Optimization of Pixel Size

Additional. SNR benefits can be achieved by changing the pixel sizes used in the imagers designated to capture each sub-band of the spectrum. As pixel sizes shrink, the effective QE of the pixel decreases since the ratio of photodiode depletion region area to pixel area decreases. Microlenses are typically used to attempt to compensate for this and they become more important as the pixel size shrinks. Another detriment to pixel performance by pixel size reduction comes from increased noise. To attempt to maintain the balance of photoactive to read-out circuit area, in many embodiments, the pixel transfer gate, source follower amplifier transistor and reset transistors are also made smaller. As these transistors reduce in size, numerous performance parameters are degraded typically resulting in noise increase.

Electrical "cross-talk" also increases as a function of reduced pixel-to-pixel spacing. Long wavelength photons penetrate deeper into the substrate before interacting with the silicon to create a charge carrier. These charge carriers wander in a somewhat random fashion before resurfacing and collection in a photodiode depletion region. This "circle" of probable resurface and collection increases as a function of generation depth. Thus the smaller the pixels become, the greater the number of pixels the circle of probable resurface covers. This effect results in a degradation of the Modulation Transfer Function (MTF) with increase in photon wavelength.

Imagers designated to capture longer wavelengths can therefore be optimized to improve system SNR by increasing the pixel size and thus increasing the QE of the pixel. Since MTF drops as a function of increased wavelength, the benefit of smaller pixels for resolution purposes is diminished with increased wavelength. Overall system resolution can thus be maintained while increasing the pixel size for longer wavelengths so as to improve QE and thus improve the overall system SNR. Although in many embodiments, imager arrays in accordance with embodiments of the invention utilize as small pixels as can be manufactured. Accordingly, increasing pixel size in the manner outlined above is simply one technique that can be utilized to improve camera performance and the specific pixel size chosen typically depends upon the specific application.

3.3.3. Imager Optimization

The push for smaller and smaller pixels has encouraged pixel designers to re-architect the pixels such that they share read-out circuits within a neighborhood. For example, a group of four photodiodes may share the same reset transistor, floating diffusion node and source follower amplifier transistors. When the four pixels are arranged in a Bayer pattern arrangement, the group of four pixels covers the full visible spectrum of capture. In imager arrays in accordance with embodiments of the invention, these shared pixel structures can be adapted to tailor the performance of pixels in a focal plane to a given capture band. The fact that these structures are shared by pixels that have different capture bands in a traditional color filter array based image sensor means that the same techniques for achieving performance improvements are typically not feasible. The improvement of the performance of pixels in a focal plane by selection of conversion gain, source follower gain, and full well capacity based upon the capture band of the pixels is discussed below. Although the discussion that follows is with reference to 4T CMOS pixels, similar improvements to pixel performance can be achieved in any imager array in which pixels share circuitry in accordance with embodiments of the invention.

3.3.3.1. Optimization of Conversion Gain

The performance of imagers within an imager array that are intended to capture specific sub-bands of the spectrum can be improved by utilizing pixels with different conversion gains tailored for each of the different capture bands. Conversion gain in a typical 4T CMOS pixel can be controlled by changing the size of the capacitance of the "sense node", typically a floating diffusion capacitor (FD). The charge to voltage conversion follows the equation $V=Q/C$ where Q is the charge, C is the capacitance and V is the voltage. Thus the smaller the capacitance, the higher the voltage resulting from a given charge hence the higher the charge-to-voltage conversion gain of the pixel. The conversion gain cannot obviously be increased infinitely however. The apparent full well capacity of the pixel (number of photo-electrons the pixel can record) will decrease if the capacitance of the FD becomes too small. This is because the electrons from the photodiode transfer into the FD due to a potential difference acting on them. Charge transfer will stop when the potential difference is zero (or a potential barrier exists between the PF and the FD). Thus if the capacitance of the FD is too small, the potential equilibrium may be reached before all electrons have been transferred out of the photodiode.

3.3.3.2. Optimization of Source Follower Gain

Additional performance gains can be achieved by changing the characteristics of the amplifiers in each pixel within a focal plane. The amplifier in a traditional 4T CMOS pixel is constructed from a Source Follower transistor. The Source Follower transistor amplifies the voltage across the FD so as to drive the pixel signal down the column line to the column circuit where the signal is subsequently sampled.

The output signal swing as a function of the input voltage swing (i.e. the Source Follower amplifier's gain) can be controlled during fabrication by changing the implant doping levels. Given the pixel photodiode's full well capacity (in electrons) and the capacitance of the FD, a range of voltages are established at the input of the Source Follower transistor by the relationship $Vin=Vrst-Q/C$ where Vrst is the reset voltage of the FD, Q is the charge of the electrons transferred to the FD from the photodiode and C is the capacitance of the FD.

The photodiode is a pinned structure such that the range of charge that may be accumulated is between 0 electrons and the full well capacity. Therefore, with a given full well capacity of the photodiode and a given capacitance of the FD and a desired output signal swing of the source follower, the optimal gain or a near optimal gain for the source follower transistor can be selected.

3.3.3.3. Optimization of Full Well Capacity

Another optimization that can be performed is through changing the full well capacity of the photodiodes. The full well capacity of the photodiode is the maximum number of electrons the photodiode can store in its maximally depleted state. The full well of the pixels can be controlled through the x-y size of the photodiode, the doping levels of the implants that form the diode structure and the voltage used to reset the pixel.

3.3.3.4. Three Parameter Optimization

As can be seen in the previous sections, there are three main characteristics that can be tuned in order to configure pixels within a focal plane that have the same capture band for improved imaging performance. The optimal solution for all three parameters is dependent on the targeted behavior of a particular focal plane. Each focal plane can be tailored to the spectral band it is configured to capture. While the design of the pixel can be optimized, in many embodiments the performance of the pixels is simply improved with respect to a specific capture band (even though the improvement may not be optimal). An example optimization is as follows and similar processes can be used to simply improve the performance of a pixel with respect to a specific capture band:

a. Optimization of the Photodiode Full Well Capacity.

Given the speed of the optics and the transmittance of the color fillers, it is possible to estimate the number of electrons that will be generated given a minimum integration time (e.g. 50 µs) for a given maximum spectral radiance. Each sub-band of the spectrum (color) will likely have a different number of electrons generated. The full well capacities of the photodiodes for each sub-band (color) can be chosen such that the maximum radiance within that band under minimum integration times will fill the well. The means by which this target full well capacity is achieved could be through changing the x-y dimensions, changing the doping levels during diode fabrication, changing the reset voltage of the pixels or a combination of two or more of these parameters.

b. Optimization of Conversion Gain

The next step is to optimize the conversion gain of the pixels. Given the number of electrons defined in the full well optimization step, an optimal capacitance for the floating diffusion can be chosen. The optimal capacitance is one, which maintains a potential difference to support charge transfer from the FD such that the full well capacity can be transferred in a reasonable duration of time. The goal of this optimization is to choose the smallest capacitance possible such that the charge to voltage conversion gain is as high as possible such that input referred noise is minimized and hence the maximum SNR for each color channel is realized.

c. Optimization of Source Follower Gain

Once the optimal full-well capacity and charge to voltage conversion gain is determined, the source follower amplifier gain can be chosen. The difference between the reset voltage of the FD (Vrst) and the voltage of the FD containing a full well charge load (Vrst-Q/C) enables the definition of an optimal gain for the source follower amplifier. The source follower gain defines the output signal swing between Vrst and Vrst-Q/C. The optimal signal swing is defined by such parameters as the operating voltage of the analog signal processing and the A/D converter that sample and covert the pixel output signal. The source follower gain is chosen for each color channel such that their respective signal swings are all matched to each other and match the maximum signal swing supported by the analog signal processing and A/D converter circuits.

Having performed these pixel level optimizations on a per capture band basis, the system will have the maximum SNR and dynamic range for each capture band given linear operation. Although the process described above is designed to provide an optimal solution with regard to maximum SNR and dynamic range, other design criteria can be used in the selection of the three parameters described above to provide improved pixel performance with respect to a specific capture band or application specific desired behavior.

3.3.4. Dynamic Range Tailoring

Further optimizations of imager arrays can be achieved by using pixels of different conversion gains within the same spectral band. For example, the "green" imagers could be constructed from pixels that have two or more different conversion gains. Therefore, each "green" imager includes pixels that have a homogeneous conversion gain, which is different to the conversion gain of pixels in another of the "green" imagers in the array. Alternatively, each imager could be constructed from a mosaic of pixels having different conversion gains.

As mentioned previously, as the conversion gain increases beyond a certain threshold, the input referred noise continues to decrease but at the expense of effective full well capacity. This effect can be exploited to yield a system having a higher dynamic range. For example, half of all "green" focal planes could be constructed using a conversion gain that optimizes both input referred noise and full well capacity (a "normal green"). The other half of all "green" focal planes could be constructed from pixels that have a higher conversion gain, hence lower input referred noise and lower effective full well capacity ("fast green"). Areas of a scene having a lower light level could be recovered from the "fast green" pixels (that are not saturated) and areas of brighter light level could be recovered from the "normal green" pixels. The result is an overall increase in dynamic range of the system. Although, a specific 50/50 allocation of focal planes between "fast green" and "normal green" is discussed above the number of focal planes dedicated to "fast" imaging and the number of focal planes dedicated to "normal." imaging is entirely dependent upon the requirements of a specific application. In addition, separate focal planes dedicated to "fast" and "normal." imaging can be utilized to increase the dynamic range of other spectral bands and is not simply limited to increasing the dynamic range with which an imager array captures green light.

A similar effect could be achieved by controlling the integration time of the "fast" and "normal." green sub-arrays such that the "fast" pixels integrate for longer. However in a non-stationary scene, this could result in motion artifacts since the "fast" pixels would integrate the scene motion for longer than the "normal." pixels creating an apparent spatial disparity between the two green channels, which may be undesirable.

Although the present invention has been described in certain specific embodiments, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

3.4. Peripheral Circuitry

In a conventional imager, pixels are typically accessed in a row-wise fashion using horizontal control lines that run across each row of pixels. Output signal lines that run vertically through each pixel are used to connect the pixel output to a sampling circuit at the column periphery. The horizontal control lines and the output signal lines are typically implemented as metal traces on silicon. The outputs from all pixels in a row are simultaneously sampled at the column periphery, and scanned out sequentially using column controllers. However, common row-wise access along the full row of K pixels in a imager array does not enable the imagers to be read out independently. As noted above, many of the benefits of utilizing an imager array derive from the independence of the focal planes and the ability for the imager array to separately control the capture of image information by the pixels in each focal plane. The ability to separately control the capture of information means that the capture of image information by the pixels in a focal plane can be customized to the spectral band the focal plane is configured to capture. In a number of embodiments, the ability to provide separate trigger times can be useful in synchronizing the capture of images using focal planes that have different integration times and in capturing sequences of images that can be registered to provide slow motion video sequences. In order to control the capture of image information by different focal planes within a imager array, independent read-out control can be provided for each focal plane. In several embodiments, the imager array has independent read-out control due to the fact that each focal plane has an associated row (column) controller, column (row) read-out circuits and a dedicated pixel signal analog processor and digitizer. In many embodiments, separate control of the capture of image information by pixels in different focal planes is achieved using peripheral circuitry that is shared between focal planes. Imager arrays implemented using dedicated peripheral circuitry and shared peripheral circuitry in accordance with embodiments of the invention are discussed below.

3.4.1. Dedicated Peripheral Circuitry

Figure 3:
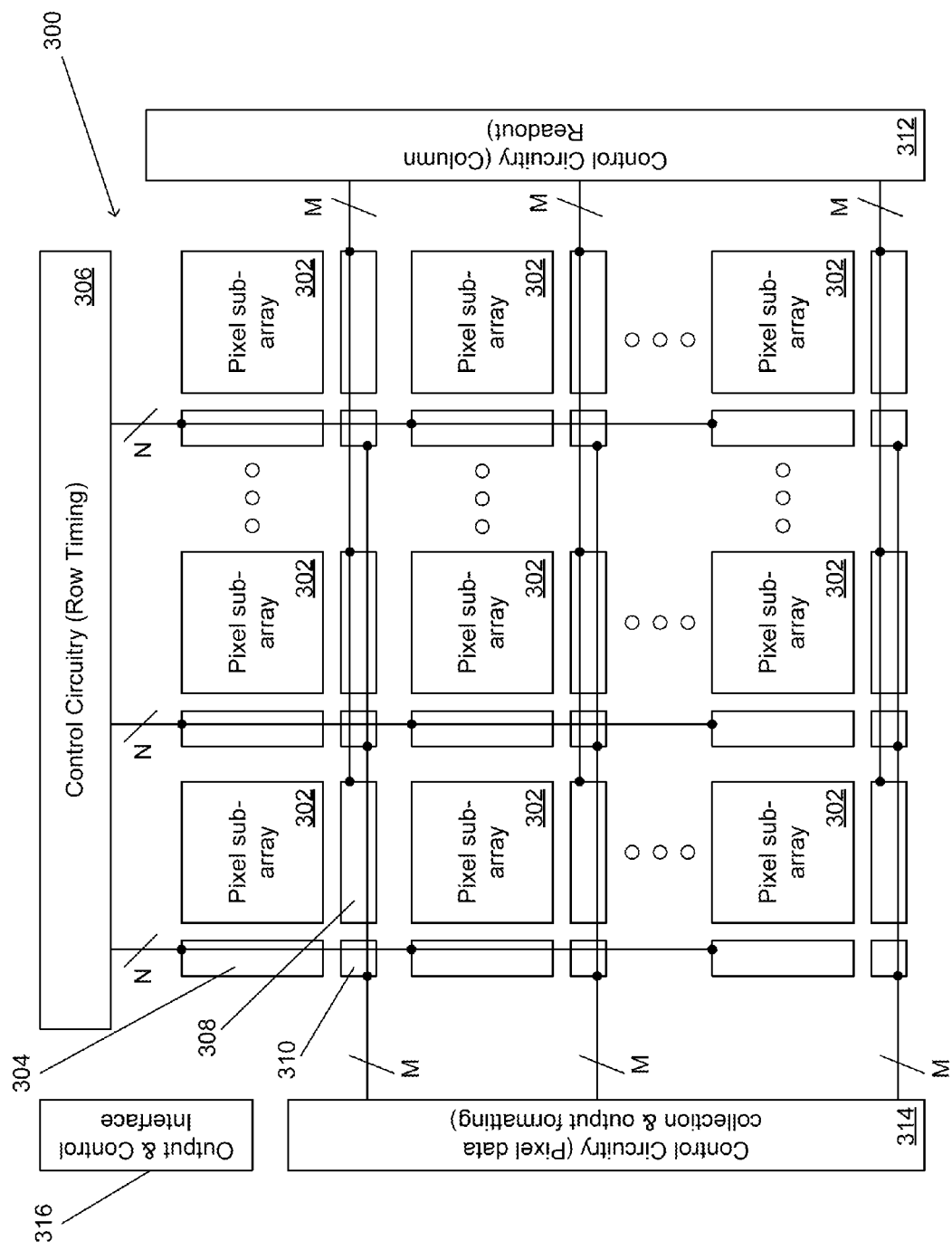
FIG. 3 illustrates an architecture of a imager array in accordance with an embodiment of the invention.

A imager array including multiple focal planes having independent read-out control and pixel digitization, where each focal plane has dedicated peripheral circuitry, in accordance with embodiments of the invention is illustrated in FIG. 3. The imager array 300 includes a plurality of sub-arrays of pixels or focal planes 302. Each focal plane has dedicated row control logic circuitry 304 at its periphery, which is controlled by a common row timing control logic circuitry 306. Although the column circuits and row decoder are shown as a single block on one side of the focal plane, the depiction as a single block is purely conceptual and each logic block can be split between the left/right and/or top/bottom of the focal plane so as to enable layout at double the pixel pitch. Laying out the control and read-out circuitry in this manner can result in a configuration where even columns are sampled in one bank of column (row) circuits and odd columns would be sampled in the other.

In a device including M×N focal planes, the read-out control logic includes M sets of column control outputs per row of focal planes (N). Each column sampling/read-out circuit 308 can also have dedicated sampling circuitry for converting the captured image information into digital pixel data. In many embodiments, the sampling circuitry includes Analog Signal. Processor (ASP), which includes an Analog Front End (AFE) amplifier circuit and an Analog to Digital. Converter (ADC) 310. In other embodiments, any of a variety of analog circuitry can be utilized to convert captured image information into digitized pixel information. An ASP can be implemented in a number of ways, including but not limited to, as a single ASP operating at X pixel conversion per row period, where X is the number of pixels in a row of the focal plane served by the column sampling circuit (e.g. with a pipe-lined or SAR ADC), as X ASPs operating in parallel at 1 pixel conversion per row period or P ASPs operating in parallel at X/P conversions per row (see discussion below). A common read-out control circuit 312 controls the read-out of the columns in each imager.

In the illustrated embodiment, the master control logic circuitry 314 controls the independent read-out of each imager. The master control logic circuitry 314 includes high level timing control logic circuitry to control the image capture and read-out process of the individual focal plane. In a number of embodiments, the master control portion of this block can implement features including but not limited to: staggering the start points of image read-out such that each focal plane has a controlled temporal offset with respect to a global reference; controlling integration times of the pixels within specific focal planes to provide integration times specific to the spectral bandwidths being imaged; the horizontal and vertical read-out direction of each imager; the horizontal and vertical sub-sampling/binning/windowing of the pixels within each focal plane; the frame/row/pixel rate of each focal plane; and the power-down state control of each focal plane.

The master control logic circuitry 314 handles collection of pixel data from each of the imagers. In a number of embodiments, the master control logic circuitry packs the image data into a structured output format. Given that fewer than M×N output ports are used to output the image data (e.g. there are 2 output ports), the imager data is time multiplexed onto these output ports. In a number of embodiments, a small amount of memory (FIFO) is used to buffer the data from the pixels of the imagers until the next available time-slot on the output port 316 and the master control logic circuitry 314 or other circuitry in the imager array periodically inserts codes into the data stream providing information including, but not limited to, information identifying a focal plane, information identifying a row and/or column within a focal plane, and/or information identifying the relative time at which the capture or read-out process began/ended for one or more of the focal planes. Relative time information can be derived from an on-chip timer or counter, whose instantaneous value can be captured at the start/end of read-out of the pixels from each imager either at a frame rate or a line rate. Additional codes can also be added to the data output so as to indicate operating parameters such as (but not limited to) the integration time of each focal plane, and channel gain. As is discussed further below, the host controller can fully re-assemble the data stream back into the individual images captured by each focal plane. In several embodiments, the imager array includes sufficient storage to buffer at least a complete row of image data from all focal planes so as to support reordering and or retiming of the image data from all focal planes such that the data is always packaged with the same timing/ordering arrangement regardless of operating parameters such as (but not limited to) integration time and relative read-out positions. In a number of embodiments, the imager array includes sufficient storage to buffer at least a complete line of image data from all focal planes so as to support reordering and or retiming of the image data from all focal planes such that the data is packaged in a convenient manner to ease the host's reconstruction of the image data, for example retiming/reordering the image data to align the data from all focal planes to a uniform row start position for all focal planes irrespective of relative read-out position.

3.4.2. ASP Sharing

Figure 4:
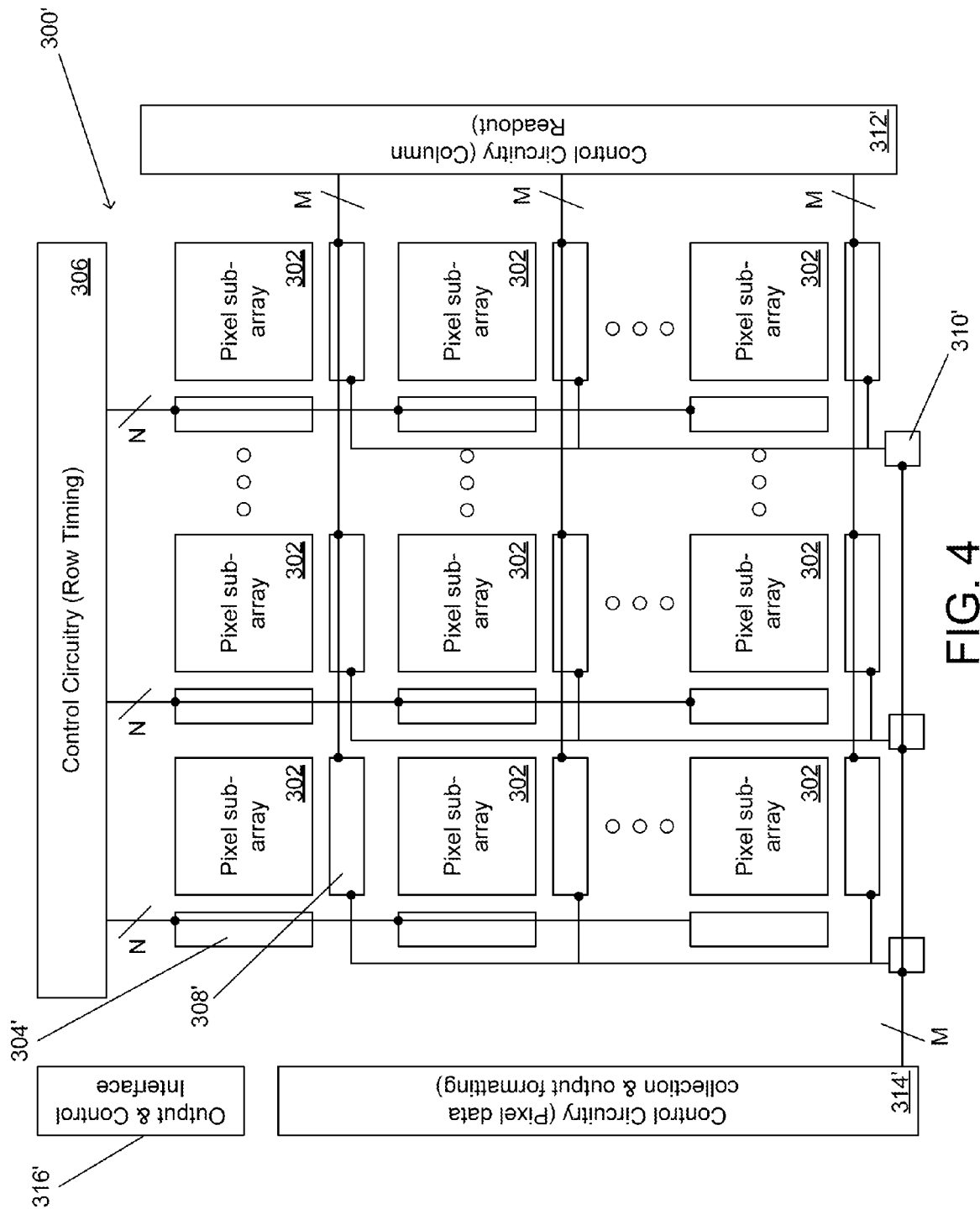
FIG. 4 illustrates another architecture of a imager array including shared analog to digital converters in accordance with an embodiment of the invention.

The imager array illustrated in FIG. 3 includes a separate ASP associated with each focal plane. A imager array can be constructed in accordance with embodiments of the invention in which ASPs or portions of the ASPs such as (but not limited to) the AFE or the ADC are shared between focal planes. A imager array that shares ASPs between multiple focal planes in accordance with embodiments of the invention is illustrated in FIG. 4. The imager array 300' utilizes an ASP 310' for sampling of all the pixels in one column of the M×N array of focal planes. In the illustrated embodiment, there are M groups of analog pixel signal read-out lines connected to M ASPs. Each of the M groups of analog pixel signal read-out lines has N individual lines. Each of the M ASPs sequentially processes each pixel signal on its N inputs. In such a configuration the ASP performs at least N processes per pixel signal period of the N inputs given that each focal plane at its input is in an active state. If one or more of an ASP's focal plane inputs is in an inactive or power down state, the processing rate could be reduced (so as to achieve a further saving in power consumption) or maintained (so as to achieve an increase in frame rate). Alternatively, a common single analog pixel signal read-out line can be shared by all column circuits in a column of focal planes (N) such that the time multiplexing function of the ASP processing can be implemented through sequencing controlled by the column read-out control block 312'.

Although the imager array illustrated in FIG. 4 includes shared ASPs, imager arrays in accordance with many embodiments of the invention can include dedicates AFEs and share ADCs. In other embodiments, the sharing ratios of the AFE and ADC do not follow the same number of focal planes. In several embodiments, each focal plane may have a dedicated AFE but two or more AFE outputs are input to a common ADC. In many embodiments, two adjacent focal planes share the same AFE and one or more of these focal plane couples would then be input into an ADC. Accordingly, AFEs and ADCs can be shared between different focal planes in a SOC imager any of a variety of different ways appropriate to specific applications in accordance with embodiments of the invention.

Figure 4A:
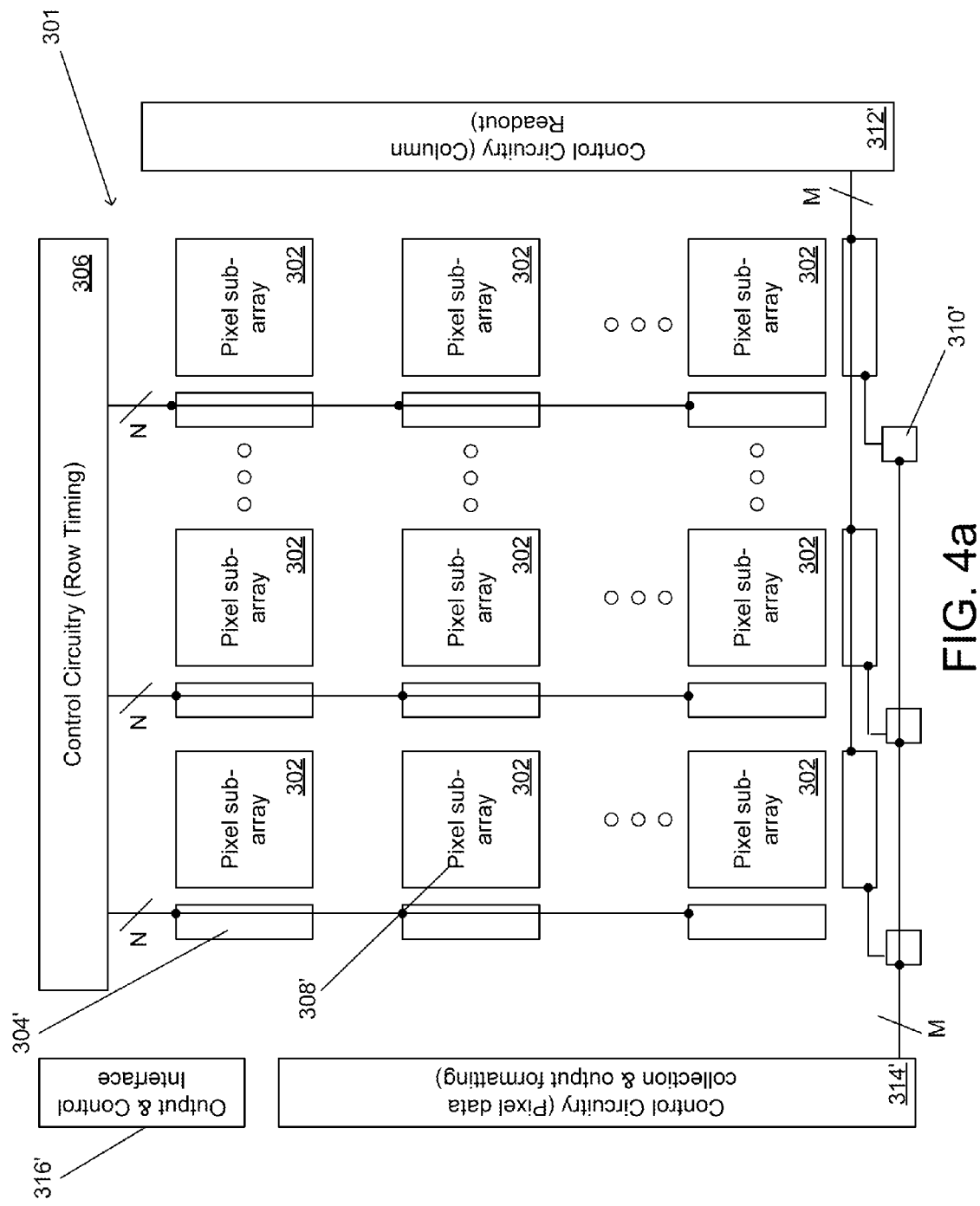
FIG. 4A illustrates a further architecture of a imager array including shared column circuits in accordance with an embodiment of the invention.
Figure 4B:
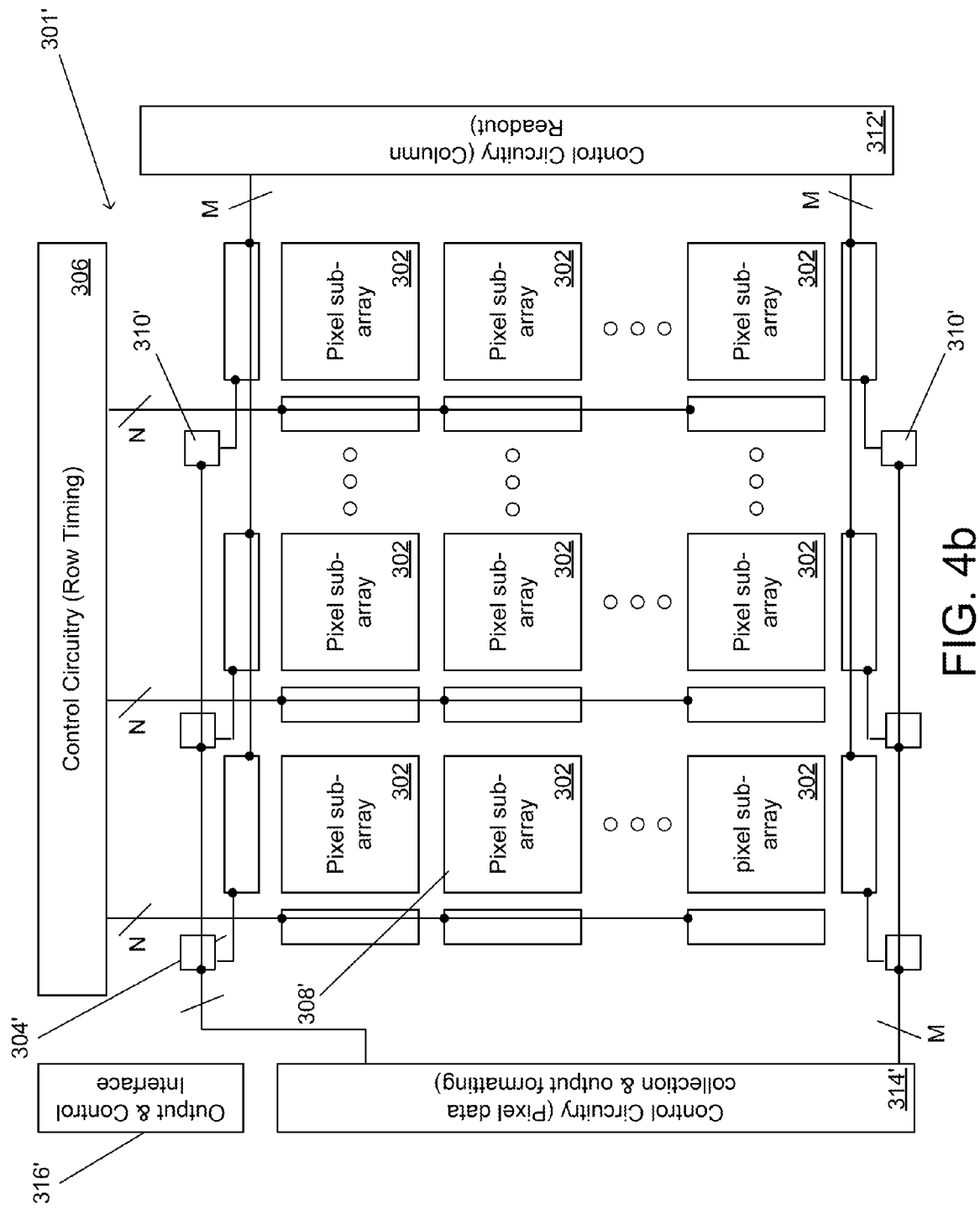
FIG. 4B illustrates still another architecture of a imager array including shared split column circuits in accordance with an embodiment of the invention.
Figure 4D:
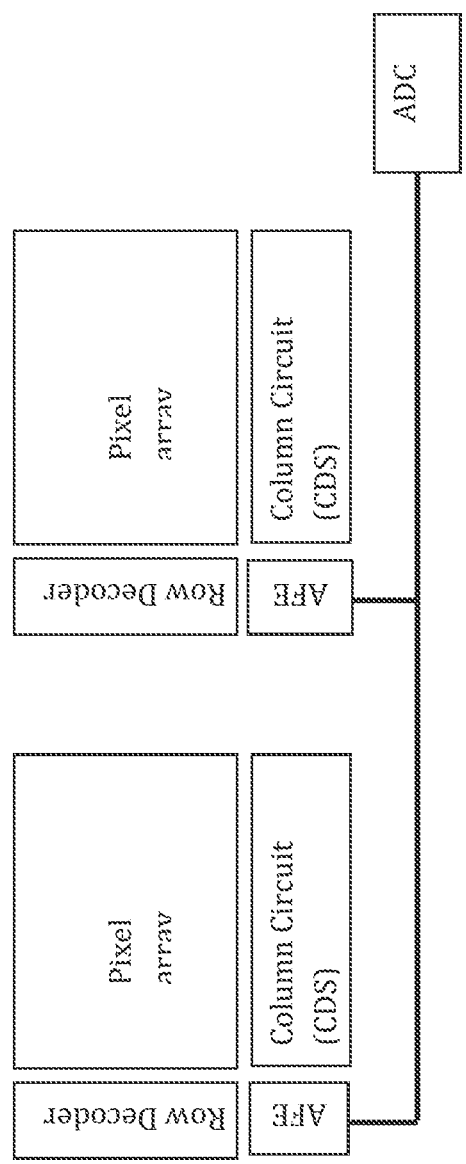
FIG. 4D illustrates a pair of focal planes in a imager array having dedicated analog front end circuitry and sharing an analog to digital converter in accordance with an embodiment of the invention.
Figure 4E:
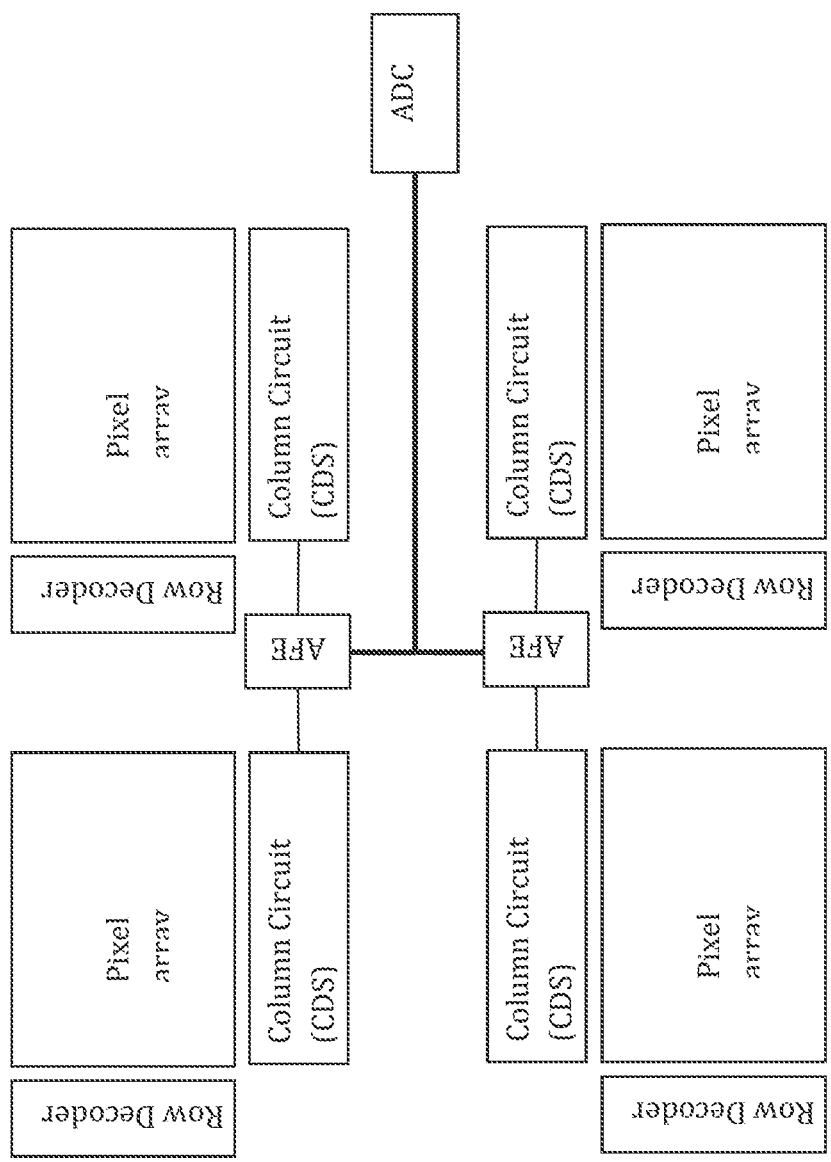
FIG. 4E illustrates a group of four focal planes in a imager array where pairs of focal planes share analog front end circuitry and the group of four focal planes share an analog to digital converter in accordance with an embodiment of the invention.

Sharing of ADCs between pairs of focal planes in a imager array in accordance with embodiments of the invention is illustrated in FIG. 4d. In the illustrated embodiment, the sharing of ADCs between pairs of focal planes can be replicated amongst multiple pairs of focal planes within an imager array. Sharing of AFEs between pairs of focal planes and sharing of ADCs between groups of four focal planes in a imager array in accordance with embodiments of the invention is illustrated in FIG. 4e. The sharing of AFEs and ADCs illustrated in FIG. 4e can be replicated amongst multiple groups of four focal planes within an imager array. In many embodiments, sharing occurs in pairs of focal planes and/or groups of three or more focal planes.

In many embodiments, the pixels within each focal plane are consistently processed through the same circuit elements at all times such that they have consistent offset and gain characteristics. In many embodiments, the control and read-out circuits and AFE are controlled by a common clocking circuit such that the phases and time slot assignment of each focal plane are consistent. An example of the phase shift between the column read-out of the different focal planes in accordance with embodiments of the invention is illustrated in FIG. 4c. As can be seen, the read-out of the columns in each focal plane is staggered to enable processing by a shared ASP in accordance with embodiments of the invention.

In order to support a reduction of power when certain focal planes are not imaging, the ASP, clocking, and bias/current schemes utilized within the imager array can support multiple sample rate configurations such that the sampling rate is always P times the pixel rate of a single focal plane, where P is the number of active focal planes being processed/sampled.

A rotated variation of the resource sharing architecture illustrated in FIG. 4 can also be implemented whereby a single ASP is shared among all pixels in a row of M×N (rather than in a column of M×N). Such an arrangement would, therefore, involve use of N ASPs each having M inputs or a single input that is common to the M focal planes, and time-multiplexed by the column read-out control block using sequencing control.

3.4.3. Column Circuit Sharing

In another embodiment of the invention, fewer than M*N column circuits are used for sampling the pixel values of the focal planes in an imager array. A imager array 301 configured so that individual focal planes within a column of the imager array share a common column circuit block 308' such that the device utilizes only M sets of column circuits in accordance with an embodiment of the invention is illustrated in FIG. 4a. The M column circuits are accompanied by M ASPs 310'.

Figure 4F:
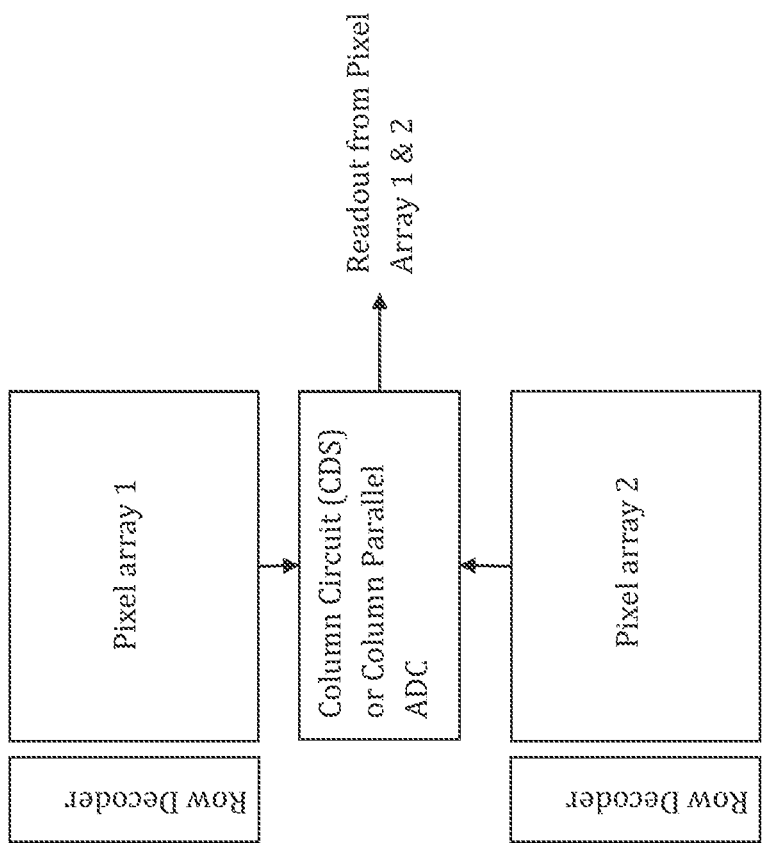
FIG. 4F illustrates a pair of focal planes within a imager array where the pair of focal planes share column control read-out circuitry in accordance with an embodiment of the invention.

In several embodiments, the column circuits are time shared such that they enable read-out of pixels from focal planes above and below the column circuit. Sharing of a column circuit between pairs of focal planes within a imager array in accordance with embodiments of the invention is illustrated in FIG. 4f. The sharing shown in FIG. 4f is the special case in FIG. 4a, where M=2. Due to the sharing of the column circuit between the pair of focal planes, the column circuit operates at twice the rate than the desired frame rate from a single focal plane. In many embodiments, the pixels are correlated double sampled and read-out either in their analog form or analog to digital converted within the column circuit. Once the last pixel has been shifted out (or the analog to digital conversion of all the columns has been performed), the column circuit can be reset to remove residual charge from the previous pixel array. A second time slot can then be used for the same operation to occur for the second focal plane. In the illustrated embodiment, the sharing of ADCs between pairs of focal planes can be replicated amongst multiple pairs of focal planes within an imager array.

In other embodiments, variations on the imager array 301 illustrated in FIG. 4a can utilize more or fewer ASPs. In addition, the column circuits 308' can be divided or combined to form more or fewer than M analog outputs for digitization. For example, an imager array can be designed such that there is a single ASP used for digitization of the M column circuits. The M outputs of the column circuits are time multiplexed at the input to the ASP. In the case that more than M ASPs are used, each of the M column circuits are further divided such that each column circuit has more than one analog output for digitization. These approaches offer trade-offs between silicon area and power consumption since the greater the number of ASPs, the slower each ASP can be so as to meet a target read-out rate (frame rate).

Figure 4G:
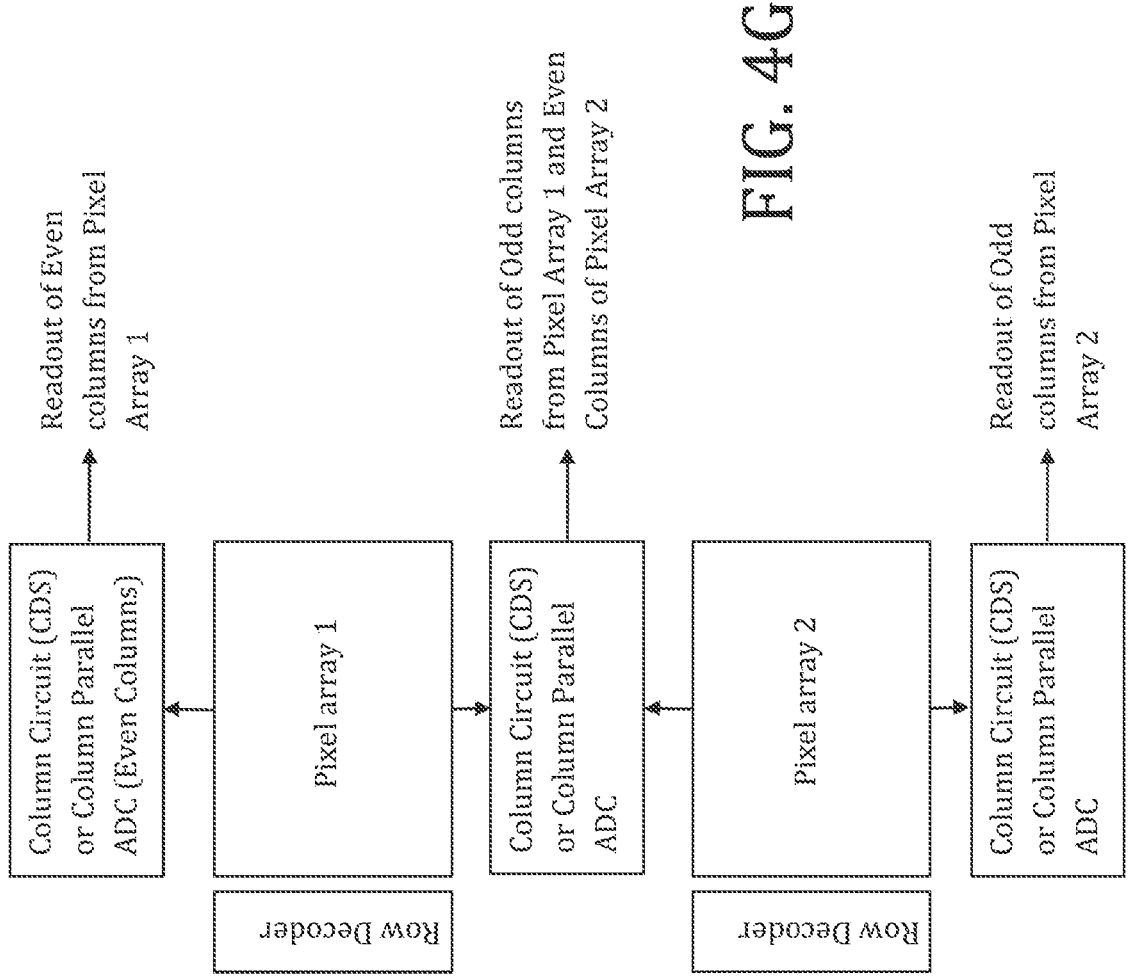
FIG. 4G illustrates a pair of focal planes within a imager array where the column control and read-out circuitry is split and a single block of column control and read-out circuitry reads out odd columns from a first focal plane and even columns from a second focal plane in accordance with an embodiment of the invention.

A structural modification to the embodiment illustrated in FIG. 4a is to split the M column circuits between the top and bottom of the imager array such that there are M*2 column circuit blocks. In such a modification each of the M*2 column circuits is responsible for sampling only half of the pixels of each focal plane in the column of focal planes (e.g. all even pixels within each focal plane could connect to the column circuit at the bottom of the array and all odd pixels could connect to the column circuit at the top). There are still M*X column sampling, circuits, however they are physically divided such that there are M*2 sets of X/2 column sampling circuits. An imager array including split column circuits in accordance with an embodiment of the invention is illustrated in FIG. 4b. The imager array 301' uses M*2 column circuit blocks (308a', 308b') and M*2 ASPs (310a', 310b'). As discussed above, there can also be fewer or more ASPs than the M*2 column circuits. Another variation involving splitting column circuits in accordance with embodiments of the invention is illustrated in FIG. 4g in which the column circuit is split into top/bottom for sampling of odd/even columns and interstitial column circuits are time shared between the focal planes above and below the column circuits. In the illustrated embodiment, the splitting of column circuits and sharing of column circuits between pairs of focal planes is replicated amongst multiple pairs of focal planes within a imager array in accordance with embodiments of the invention. In addition, each of the column circuits can be shared between an upper and lower focal plane (with the exception of the column circuits at the periphery of the imager array).

3.4.4. Number and Rate of ASPs

There are a number of different arrangements for the column sampling circuitry of imager arrays in accordance with embodiments of the invention. Often, the arrangement of the ASP circuitry follows a logical implementation of the column sampling circuits such that a single ASP is used per column circuit covering X pixels thus performing X conversions per row period. Alternatively, X ASPs can be utilized per column circuit performing one conversion per row period. In a general sense, embodiments of the invention can use P ASPs per column circuit of X pixels such that there are X/P conversions per row period. This approach is a means by which the conversion of the samples in any column circuit can be parallelized such that the overall ADC conversion process occurs at a slower rate. For example, in any of the configurations described herein it would be possible to take a column circuit arrangement that samples a number of pixels (T) and performs the analog-to-digital conversion using P ASPs, such that there are T/P conversions per row period. Given a fixed row period (as is the case with a fixed frame rate) the individual conversion rate of each ASP is reduced by the factor P. For example, if there are two ASPs, each runs at ½ the rate. If there are four, each ASP has to run at ¼ the rate. In this general sense, any number of ASPs running at a rate appropriate to a specific application irrespective of the configuration of the column circuitry can be utilized in accordance with embodiments of the invention.

3.4.5. Row Decoder Optimization

Imager arrays in accordance with embodiments of the invention possess the ability to access different rows within each focal plane at a given instant so as to enable separate operating parameters with respect to the capture of image information by the pixels of each focal plane. The row decoder is typically formed from a first combinational decode of a physical address (represented as an E bit binary number) to as many as 2E "enable" signals (often referred to as a "one-hot" representation). For example, an 8 bit physical address is decoded into 256 "enable" signals so as to support addressing into a pixel array having 256 rows of pixels. Each of these "enable" signals are in turn logically ANDED with pixel timing signals, the results of which are then applied to the pixel array so as to enable row based pixel operations such as pixel reset and pixel charge transfer.

The row decoders can be optimized to reduce silicon area through sharing of the binary to one-hot decode logic. Rather than each sub-array having a fully functional row decoder, including binary to one-hot decoding, many embodiments of the invention have a single binary to one-hot decoder for a given row of focal planes within the imager array. The "enable" outputs of this decoder are routed across all focal planes to each of the (now less functional) row decoders of each focal plane. Separate sets of pixel level timing signals would be dedicated to each focal plane (generated by the row timing and control logic circuitry) and the logical AND function would remain in each focal plane's row decoder.

Readout with such a scheme would be performed in time slots dedicated to each focal plane such that there are M timeslots per row of focal planes in the camera array. A first row within the first focal plane would be selected and the dedicated set of pixel level timing signals would be applied to its row decoder and the column circuit would sample these pixels. In the next time slot the physical address would change to point to the desired row in the next focal plane and another set of dedicated pixel level timing signals would be applied to its row decoder. Again, the column circuits would sample these pixels. The process would repeat until all focal planes within a row of focal planes in the camera array have been sampled. When the column circuits are available to sample another row from the imager array, the process can begin again.

3.5. Providing a Memory Structure to Store Image Data

An additional benefit of the separate control of the capture of image information by each focal plane in a imager array is the ability to support slow motion video capture without increasing the frame rate of the individual focal planes. In slow motion video each focal plane is read out at a slightly offset point in time. In a traditional camera, the time delta between frames (i.e. the capture frame rate) is dictated by the read-out time of a single frame. In a imager array offering support of independent read-out time of the individual focal planes, the delta between frames can be less than the read-out of an individual frame. For example, one focal plane can begin its frame read-out when another focal plane is halfway through the read-out of its frame. Therefore an apparent doubling of the capture rate is achieved without requiring the focal planes to operate at double speed. However, when outputting the stream of images from the camera, this overlapping frame read-out from all focal planes means that there is continuous imagery to output.

Camera systems typically employ a period of time between read-out or display of image data known as the blanking period. Many systems require this blanking period in order to perform additional operations. For example, in a CRT the blanking interval is used to reposition the electron beam from the end of a line or frame to the beginning of the next line or frame. In an imager there are typically blanking intervals between lines to allow the next line of pixels to be addressed and the charge therein sampled by a sampling circuit. There can also be blanking intervals between frames to allow a longer integration time than the frame read-out time.

For an array camera operating in slow motion capture mode in accordance with an embodiment of the invention, the frame read-out is offset in time in all the focal planes such that all focal planes will enter their blanking intervals at different points in time. Therefore, there typically will not be a point in time where there is no image data to transmit. Array cameras in accordance with embodiments of the invention can include a retiming FIFO memory in the read-out path of the image data such that an artificial blanking period can be introduced during transmission. The retiming FIFO temporarily stores the image data to be transmitted from all the focal planes during the points in time where a blanking interval is introduced.

3.6. Imager Array Floor Plan

Imager arrays in accordance with embodiments of the invention can include floor plans that are optimized to minimize silicon area within the bounds of certain design constraints. Such design constraints include those imposed by the optical system. The sub-arrays of pixels forming each focal plane can be placed within the image circle of each individual lens stack of the lens array positioned above the imager array. Therefore, the manufacturing process of the lens elements typically imposes a minimum spacing distance on the imagers (i.e. a minimum pitch between the focal planes). Another consideration in the focal spacing coming from optical constraints is the magnitude of stray light that can be tolerated. In order to limit optical cross-talk between focal planes, many camera arrays in accordance with embodiments of the invention optically isolate the individual focal planes from each other. An opaque barrier can be created between the optical paths of adjacent focal planes within the lens stack. The opaque barrier extends down to the sensor cover-glass and can serve the additional purpose of providing a sensor to optics bonding surface and back focus spacer. The incursion of the opaque shield into the imaging circle of the lens can result in some level of reflection back into the focal plane. In many embodiments, the complex interplay between the optics and the imager array results in the use of an iterative process to converge to an appropriate solution balancing the design constraints of a specific application.

The space between the focal planes (i.e. the spacing distance) can be used to implement control circuitry as well as sampling circuitry including (but not limited to) ASP circuits or other circuitry utilized during the operation of the imager array. The logic circuits within the imager array can also be broken up and implemented within the spacing distance between adjacent focal planes using automatic place and routing techniques.

Although specific constraints upon the floor plans of imager arrays are described above, additional constraints can be placed upon floor plans that enable the implementation of the various logic circuits of the imager array in different areas of the device in accordance with embodiments of the invention. In many embodiments, requirements such as pixel size/performance, the optical system of the array camera, the silicon real-estate cost, and the manufacturing process used to fabricate the imager array can all drive subtle variations in the imager array overall architecture and floor plan.

3.6.1. Sampling Diversity

In many embodiments, the floor plan also accommodates focal planes that are designed to accommodate an arrangement that yields a preferred sampling diversity of the scene (i.e. the pixels within one focal plane are collecting light from a slightly shifted field of view with respect to other focal planes within the imager array). This can be achieved through a variety of techniques. In several embodiments, sampling diversity is achieved by constructing the imager array so that the focal planes are relatively offset from the centers of their respective optical paths by different subpixel amounts through a relative subpixel shift in alignment between the focal planes and their respective lenses. In many embodiments, the optical field of view are "aimed" slightly differently by an angle that corresponds to a subpixel shift in the image (an amount less than the solid angle corresponding to a single pixel). In a number of embodiments, slight microlens shifts between the focal planes is utilized to alter the particular solid angle of light captured by the microlens (which redirects the light to the pixel) thus achieving a slight subpixel shift. In certain embodiments, the focal planes are constructed with pixels having subtle differences in pixel pitch between focal planes such that sampling diversity is provided irrespective of optical alignment tolerances. For example, a 4×4 imager array can be constructed with focal planes having pixels with length and width dimensions of size 2.0 um, 2.05 um, 2.1 um, 2.15 um and 2.2 um. In other embodiments, any of a variety of pixel dimensions and/or techniques for improving sampling diversity amongst the focal planes within the imager array can be utilized as appropriate to a specific application.

4. Focal Plane Timing and Control Circuitry

Referring back to FIG. 1a, imager arrays in accordance with embodiments of the invention can include focal plane timing and control circuitry 154 that controls the reset and read-out (hence integration) of the pixels in each of the focal planes within the imager array. The ability of a imager array in accordance with embodiments of the invention to provide flexibility in read-out and integration time control can enable features including (but not limited to) high dynamic range imaging, high speed video and electronic image stabilization.

Traditional image sensors nominally employ two rolling address pointers into the pixel array, whose role is to indicate rows to receive pixel level charge transfer signals as well as "row select" signals for connecting a given row to the column lines enabling sampling of the sense node of the pixels. In many SOC image arrays in accordance with embodiments of the invention these two rolling address pointers are expanded to 2×M×N rolling address pointers. The pointer pairs for each focal plane can either address the same rows within each focal plane or can be offset from one another with respect to a global reference.

Figure 4H:
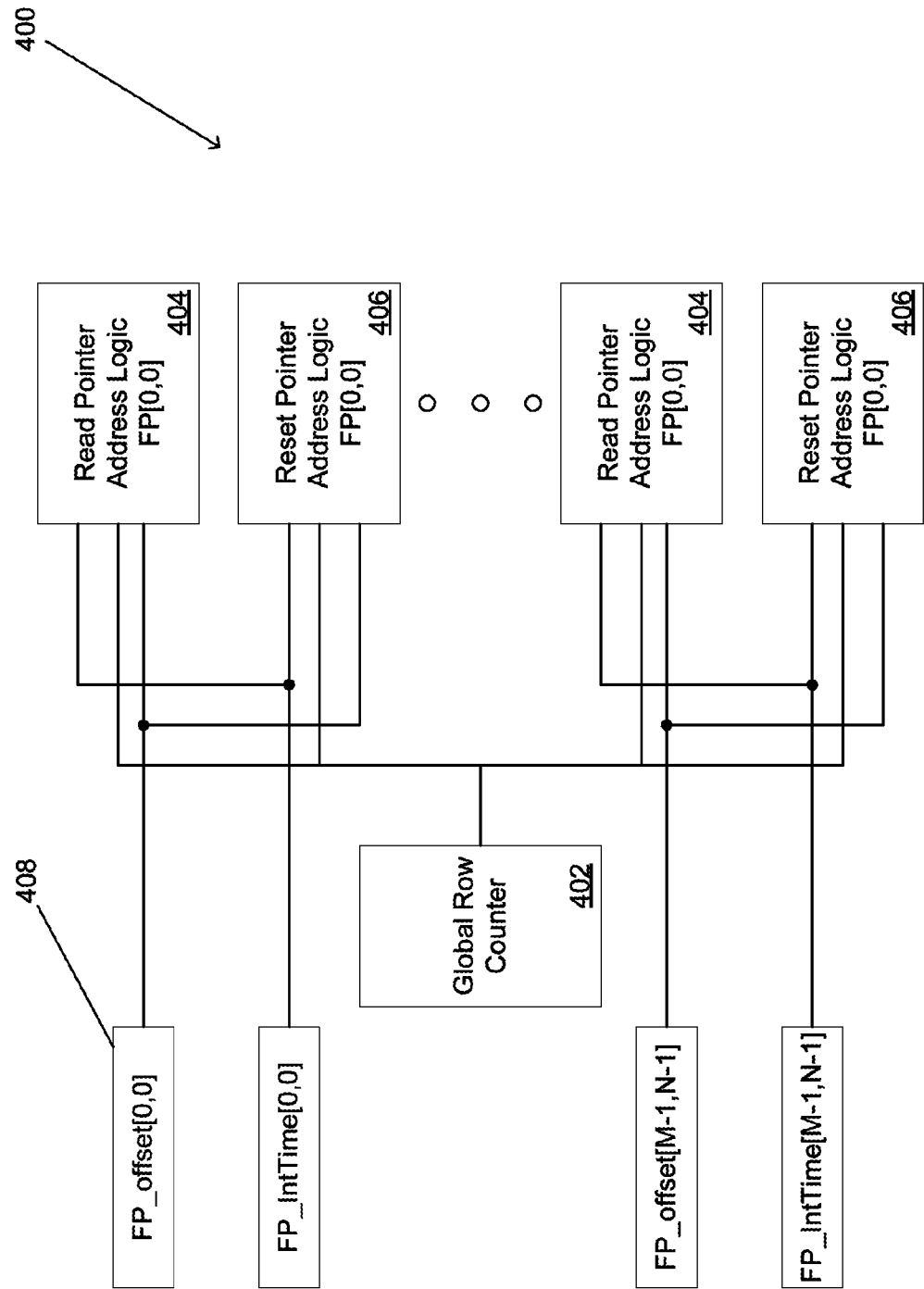
FIG. 4H is a block diagram illustrating focal plane timing and control circuitry in accordance with an embodiment of the invention.

Focal plane timing and control address pointer circuitry in accordance with an embodiment of the invention is illustrated in FIG. 4h. The focal plane timing and control circuitry 400 includes a global row counter 402 and read pointer address logic circuitry 404 and reset pointer address logic circuitry 406 associated with each focal plane. The global row counter 402 is a global reference for sampling of rows of pixels. In a number of embodiments, the global row counter 402 counts from 0 to the total number of rows within a focal plane. In other embodiments, alternative global row counters are utilized as appropriate to the requirements of a specific application. The read pointer address logic circuitry 404 and the reset pointer address logic circuitry 406 translates the global row counter value to a physical address within the array as a function of settings such as read-out direction and windowing. In the illustrated embodiment, there are M×N read pointer and reset pointer address logic circuits. Row based timing shifts of each focal plane read-out and reset positions (FP_offset[x,y]) are provided to the read pointer address logic and reset pointer address logic circuits. These timing shifts can be stored in configuration registers within the imager array. The value of the timing shifts can be added to the global row counter value (modulo the total number of rows) before translation to physical addresses by the read pointer address logic and the reset pointer address logic circuits. In this way, each focal plane can be provided with a programmable timing offset. In several embodiments, the timing offsets are configured based upon different operational modes of the array camera.

5. System Power Management and Bias Generation

The system power management bias generation circuitry is configured to provide current and or voltage references to analog circuitry such as (but not limited to) the reference voltages against which an ADC would measure the signal to be converted against. In addition, system power management and bias generation circuitry in accordance with many embodiments of the invention can turn off the current/voltage references to certain circuits when they are not in use for power saving reasons. Additional power management techniques that can be implemented using power management circuitry in accordance with embodiments of the invention are discussed below.

5.1. Power Optimization

The master control block of an imager array in accordance with embodiments of the invention can manage the power consumption of the imager array. In many embodiments, the master control block reduces power consumption by "turning off" certain focal planes during modes of operation where the desired output resolution is less than the full performance of the device. In such modes, amplifiers, bias generators, ADCs and other clocked circuits associated with the focal planes that are not used are placed in a lower power state to minimize or eliminate static and dynamic power draw.

5.1.1. Preventing Carrier Migration During Imager Power Down

Despite a focal plane being in a powered down state, light is incident upon the pixels in its sub-array. Incident photons will continue to create charge carriers in the silicon substrate. If the pixels in a powered-down focal plane are left floating, the charge carriers will fill the pixel well and deplete the potential barrier making it unable to trap any further carriers. Excess carriers, created by the persistent photon flux will then be left to wander the substrate. If these excess carriers wander from an inactive focal plane into an active focal plane, and collect in the well of a pixel in an active focal plane, they would be erroneously measured to be photo-electrons that were generated within that pixel. The result can be the appearance of blooming around the periphery of the active imager caused by the tide of free carriers migrating into the active focal plane from the inactive neighbors.

To mitigate the migration of excess carriers from inactive focal planes, the photodiodes in the pixels of an inactive focal planes are connected to the power supply via transistor switches within each pixel such that the pixel well is held open to its maximum electrical potential. Holding the well open enables the photodiode to constantly collect carriers generated by the incident light and thus reduce the problem of carrier migration from an inactive imager. The transistors in each pixel are part of the normal pixel architecture i.e. the transfer gate, and it is the master control logic along with the row controllers that signal the transistors to hold the wells open.

5.1.2. Standby Mode

In many embodiments, reference pixels are used in the calibration of dark current and FPN. In several embodiments, the power management circuitry is configured to enable the powering down of the pixels in a focal plane in such a way that the reference pixels remain active. In several embodiments, this is achieved by powering the ASP during the readout of reference pixels but otherwise maintaining the ASP in a low power mode. In this way, the focal plane can be more rapidly activated by reducing the need to calibrate dark current and FPN when the focal plane is woken up. In many instances, calibration is performed with respect to dark current and FPN when the reference pixels are powered down during the low power state of the focal plane. In other embodiments, any of a variety of partial powering of circuitry can be utilized to reduce the current drawn by a focal plane and its associated peripheral circuitry in accordance with embodiments of the invention.

6. Focal Plane Data Collation and Framing Logic

Referring again to FIG. 1a, imager arrays in accordance with several embodiments of the invention include focal plane data collation and framing logic circuitry that is responsible for capturing the data from the focal planes and packaging the data into a container in accordance with a predetermined container format. In a number of embodiments, the circuitry also prepares the data for transmission by performing data transformations including but not limited to any bit reduction to the data (e.g. 10 bit to 8 bit conversion).

Although specific imager array architectures are described above, alternative imager array architectures can be used to implement. Imager arrays based upon requirements, including but not limited to, pixel size/performance, the optical system of the array camera, the silicon real-estate cost, and the manufacturing process used to fabricate the imager array in accordance with embodiments of the invention. In addition, imager arrays in accordance with embodiments of the invention can be implemented using any of a variety of shapes of pixels including but not limited to square pixels, rectangular pixels, hexagonal pixels, and a variety of pixel shapes. Accordingly, the scope of the invention should be determined not by the embodiments illustrated, but by the appended claims and their equivalents.

What is claimed is:

1. An imager array, comprising:
   a plurality of focal planes, where each focal plane comprises a two dimensional arrangement of pixels having at least two pixels in each dimension and each focal plane is contained within a region of the imager array that does not contain pixels from another focal plane;
   control circuitry configured to control the capture of image information by the pixels within the focal planes, where the control circuitry is configured so that the capture of image information by the pixels in at least two of the focal planes is separately controllable, wherein the control circuitry is further configured to capture images for each of the plurality of active focal planes;
   sampling circuitry configured to convert pixel outputs into digital pixel data;
   master control logic circuitry configured to generate at least one line of image data by time multiplexing the digital pixel data of each image captured by each of the plurality of active focal planes, wherein the control circuitry is further configured to insert codes between the digital pixel data that provide information for use in re-assembling the at least one line of image data back into the individual images captured by each active focal plane; and
   output interface circuitry configured to transmit pixel data via an output interface.

2. The imager array of claim 1, wherein:
   the imager array includes M×N focal planes;
   the output interface includes less than M×N output ports; and
   the control circuitry is configured to time multiplex the pixel data onto the output ports of the output interface.

3. The imager array of claim 1, wherein the control circuitry further comprises memory configured to buffer pixel data from the plurality of focal planes until a time-slot is available on an output port of the output interface to transmit the pixel data.

4. The imager array of claim 1, where the codes provide information identifying a focal plane.

5. The imager array of claim 1, where the codes provide information identifying at least one row of pixels within a focal plane.

6. The imager array of claim 1, where the codes provide information identifying at least one column of pixels within a focal plane.

7. The imager array of claim 1, where the codes provide information identifying the relative time of pixel data capture.

8. The imager array of claim 7, wherein the codes provide information identifying the relative start time of the pixel data capture.

9. The imager array of claim 7, wherein the codes provide information identifying the relative end time of the pixel data capture.

10. The imager array of claim 7, wherein the control circuitry further comprises a counter and the codes that provide information identifying the relative time of pixel data capture are generated using the counter.

11. The imager array of claim 1, where the codes provide information concerning operating parameters of the imager array.

12. The imager array of claim 11, wherein the codes provide the integration time of each focal plane.

13. The imager array of claim 11, wherein the codes provide the gain of each focal plane.

14. The imager array of claim 1, wherein the output interface circuitry is configured to insert a frame blanking interval between transmission of pixel data via the output interface.

15. The imager array of claim 14, wherein the output interface circuitry is further configured to insert a line blanking interval between transmission of lines of pixel data via the output interface.

16. The imager array of claim 1, wherein the output interface circuitry is configured to transform the pixel data by performing bit reductions.

17. The imager array of claim 3, wherein the memory is sufficient to buffer at least a complete row of image data from all active focal planes so as to support at least one of reordering and retiming of the image data from all focal planes.

18. A method of obtaining pixel data, comprising:
   separately capturing pixel data of a plurality of images using an imager array having a plurality of focal planes that each capture an image when active, where each focal plane comprises a two dimensional arrangement of pixels having at least two pixels in each dimension and each focal plane is contained within a region of the imager array that does not contain pixels from another focal plane;
   during the capture of the pixel data, (i) generating at least one line of image data by multiplexing the pixel data of each image captured by each of the plurality of active focal planes and (ii) buffering portions of the captured pixel data within memory in the imager array;
   using control circuitry on the imager array to insert codes between the pixel data that provide information for use in re-assembling the at least one line of image data back into the individual images captured by each active focal plane; and
   transmitting the buffered pixel data via an output interface in the imager array when a time-slot is available on an output port.

19. The method of claim 18, where the codes provide information identifying a focal plane.

20. The method of claim 18 where the codes provide information identifying at least one row of pixels within a focal plane.

21. The method of claim 18, where the codes provide information identifying at least one of:
   at least one column of pixels within a focal plane;
   the relative time of pixel data capture;

the relative start time of the pixel data capture;
the relative end time of the pixel data capture;
the integration time of each focal plane; and
the gain of each focal plane.

22. The method of claim 18, further comprising using control circuitry on the imager array to insert a line blanking interval between transmissions of buffered pixel data via the output interface.

23. The method of claim 21, further comprising using control circuitry on the imager array to insert a frame blanking interval upon completion of the transmission of the captured pixel data.

24. The imager array of claim 17, wherein the image data is packaged with a same timing or ordering arrangement.

25. The imager array of claim 17, wherein the image data from all active focal planes is aligned to a uniform row start portion.

* * * * *